United States Patent
Allen et al.

(10) Patent No.: US 11,416,941 B1
(45) Date of Patent: Aug. 16, 2022

(54) ELECTRONIC SENSOR MANAGEMENT

(71) Applicant: UNITED SERVICES AUTOMOBILE ASSOCIATION, San Antonio, TX (US)

(72) Inventors: Michael J. Allen, San Antonio, TX (US); Ramsey Devereaux, San Antonio, TX (US); Spencer Read, Helotes, TX (US); David S. Franck, San Antonio, TX (US); William Chandler, San Antonio, TX (US); Justin D. Haslam, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 591 days.

(21) Appl. No.: 15/896,848

(22) Filed: Feb. 14, 2018

Related U.S. Application Data

(63) Continuation-in-part of application No. 15/724,103, filed on Oct. 3, 2017, now Pat. No. 10,977,736, which
(Continued)

(51) Int. Cl.
*G06Q 40/08* (2012.01)
*G06Q 10/00* (2012.01)

(52) U.S. Cl.
CPC ............ *G06Q 40/08* (2013.01); *G06Q 10/20* (2013.01); *G06Q 2220/00* (2013.01)

(58) Field of Classification Search
None
See application file for complete search history.

(56) References Cited

U.S. PATENT DOCUMENTS

| 4,247,757 A | 1/1981 | Crump, Jr. |
| 5,182,705 A | 1/1993 | Barr et al. |
(Continued)

FOREIGN PATENT DOCUMENTS

| AT | 503861 B1 | 6/2008 |
| CA | 2478911 A1 | 9/2003 |
(Continued)

OTHER PUBLICATIONS

"After an Auto Accident Understanding the Claims Process," Financial Services Commission on Ontario, 2011, 10 pgs.
(Continued)

*Primary Examiner* — Jason Borlinghaus
(74) *Attorney, Agent, or Firm* — Fletcher Yoder P.C.

(57) ABSTRACT

A computer device and method for managing multiple electronic sensors is provided where a server receives building condition data from a motion sensor, analyzes the received data, and activates (or reconfigures) a camera sensor to capture an image of the inhabitants present within the building; the server then identifies the inhabitant of the building and retrieves profile data associated with the identified inhabitant; the server then, based on the profile data, generates an instruction to modify one or more conditions within the building (e.g., the environmental conditions of the building) and transmits the instruction to one or more devices (e.g., an environmental device) within the building.

18 Claims, 7 Drawing Sheets

Related U.S. Application Data is a continuation of application No. 14/303,382, filed on Jun. 12, 2014, now Pat. No. 9,811,862.

(60) Provisional application No. 61/948,192, filed on Mar. 5, 2014, provisional application No. 61/943,897, filed on Feb. 24, 2014, provisional application No. 61/943,901, filed on Feb. 24, 2014, provisional application No. 61/943,906, filed on Feb. 24, 2014, provisional application No. 61/926,532, filed on Jan. 13, 2014, provisional application No. 61/926,541, filed on Jan. 13, 2014, provisional application No. 61/926,536, filed on Jan. 13, 2014, provisional application No. 61/926,534, filed on Jan. 13, 2014, provisional application No. 61/926,103, filed on Jan. 10, 2014, provisional application No. 61/926,095, filed on Jan. 10, 2014, provisional application No. 61/926,111, filed on Jan. 10, 2014, provisional application No. 61/926,118, filed on Jan. 10, 2014, provisional application No. 61/926,119, filed on Jan. 10, 2014, provisional application No. 61/926,121, filed on Jan. 10, 2014, provisional application No. 61/926,123, filed on Jan. 10, 2014, provisional application No. 61/926,091, filed on Jan. 10, 2014, provisional application No. 61/926,108, filed on Jan. 10, 2014, provisional application No. 61/926,114, filed on Jan. 10, 2014, provisional application No. 61/926,093, filed on Jan. 10, 2014, provisional application No. 61/926,098, filed on Jan. 10, 2014.

(56) References Cited

U.S. PATENT DOCUMENTS

| | | | |
|---|---|---|---|
| 5,235,507 | A | 8/1993 | Sackler et al. |
| 5,325,291 | A | 6/1994 | Garrett et al. |
| 5,526,609 | A | 6/1996 | Lee et al. |
| 5,724,261 | A | 3/1998 | Denny et al. |
| 5,950,169 | A | 9/1999 | Borghesi et al. |
| 5,960,338 | A | 9/1999 | Foti |
| 5,991,733 | A | 11/1999 | Aleia et al. |
| 6,029,141 | A | 2/2000 | Bezos et al. |
| 6,049,773 | A | 4/2000 | McCormack et al. |
| 6,141,686 | A | 10/2000 | Jackowski et al. |
| 6,526,807 | B1 | 3/2003 | Doumit et al. |
| 6,686,838 | B1 | 2/2004 | Rezvani et al. |
| 6,766,322 | B1 | 7/2004 | Bell |
| 6,826,607 | B1 | 11/2004 | Gelvin et al. |
| 6,985,907 | B2 | 1/2006 | Zambo et al. |
| 7,015,789 | B1 | 3/2006 | Helgeson |
| 7,138,914 | B2 | 11/2006 | Culpepper et al. |
| 7,142,099 | B2 | 11/2006 | Ross et al. |
| 7,170,418 | B2 | 1/2007 | Rose-Pehrsson et al. |
| 7,203,654 | B2 | 4/2007 | Menendez |
| 7,398,218 | B1 | 7/2008 | Bemaski et al. |
| 7,406,436 | B1 | 7/2008 | Reisman |
| 7,602,196 | B2 | 10/2009 | Vokey |
| 7,610,210 | B2 | 10/2009 | Helitzer et al. |
| 7,624,031 | B2 | 11/2009 | Simpson et al. |
| 7,624,069 | B2 | 11/2009 | Padgette |
| 7,711,584 | B2 | 5/2010 | Helitzer et al. |
| 7,716,076 | B1 | 5/2010 | Block et al. |
| 7,739,133 | B1 | 6/2010 | Hail et al. |
| 7,809,587 | B2 | 10/2010 | Dorai et al. |
| 7,869,944 | B2 | 1/2011 | Deaton et al. |
| 7,885,831 | B2 | 2/2011 | Burton et al. |
| 7,899,560 | B2 | 3/2011 | Eck |
| 7,937,437 | B2 | 5/2011 | Fujii |
| 7,945,497 | B2 | 5/2011 | Kenefick et al. |
| 7,949,548 | B2 | 5/2011 | Mathai et al. |
| 7,958,184 | B2 | 6/2011 | Barsness et al. |
| 7,969,296 | B1 | 6/2011 | Stell |
| 8,004,404 | B2 | 8/2011 | Izumi et al. |
| 8,041,636 | B1 | 10/2011 | Hunter et al. |
| 8,046,243 | B2 | 10/2011 | Winkler |
| 8,069,181 | B1 | 11/2011 | Krishnan et al. |
| 8,081,795 | B2 | 12/2011 | Brown |
| 8,086,523 | B1 | 12/2011 | Palmer |
| 8,090,598 | B2 | 1/2012 | Bauer et al. |
| 8,095,394 | B2 | 1/2012 | Nowak et al. |
| 8,103,527 | B1 | 1/2012 | Lasalle et al. |
| 8,106,769 | B1 | 1/2012 | Maroney et al. |
| 8,229,767 | B2 | 7/2012 | Birchall |
| 8,249,968 | B1 | 8/2012 | Oldham et al. |
| 8,265,963 | B1 | 9/2012 | Hanson et al. |
| 8,271,303 | B2 | 9/2012 | Helitzer et al. |
| 8,271,308 | B2 | 9/2012 | Winkler |
| 8,271,321 | B1 | 9/2012 | Kestenbaum |
| 8,289,160 | B1 | 10/2012 | Billman |
| 8,294,567 | B1 | 10/2012 | Stell |
| 8,306,258 | B2 | 11/2012 | Brown |
| 8,332,242 | B1 | 12/2012 | Medina, III |
| 8,332,348 | B1 | 12/2012 | Avery |
| 8,384,538 | B2 | 2/2013 | Breed |
| 8,400,299 | B1 | 3/2013 | Maroney et al. |
| 8,428,972 | B1 | 4/2013 | Noles et al. |
| 8,452,678 | B2 | 5/2013 | Feldman et al. |
| 8,510,196 | B1 | 8/2013 | Brandmaier et al. |
| 8,515,788 | B2 | 8/2013 | Tracy et al. |
| 8,521,542 | B1 | 8/2013 | Stotts |
| 8,527,306 | B1 | 9/2013 | Reeser et al. |
| 8,600,104 | B2 | 12/2013 | Brown |
| 8,635,091 | B2 | 1/2014 | Amigo et al. |
| 8,638,228 | B2 | 1/2014 | Amigo et al. |
| 8,650,048 | B1 | 2/2014 | Hopkins, III et al. |
| 8,676,612 | B2 | 3/2014 | Helitzer et al. |
| 8,719,061 | B2 | 5/2014 | Birchall |
| 8,731,975 | B2 | 5/2014 | English et al. |
| 8,760,285 | B2 | 6/2014 | Billman et al. |
| 8,774,525 | B2 | 7/2014 | Pershing |
| 8,782,395 | B1 | 7/2014 | Ly |
| 8,788,299 | B1 | 7/2014 | Medina, III |
| 8,788,301 | B1 | 7/2014 | Marlow et al. |
| 8,799,034 | B1 | 8/2014 | Brandmaier et al. |
| 8,812,414 | B2 | 8/2014 | Arthur et al. |
| 8,813,065 | B2 | 8/2014 | Zygmuntowicz et al. |
| 8,868,541 | B2 | 10/2014 | Lin et al. |
| 8,872,818 | B2 | 10/2014 | Freeman et al. |
| 8,910,298 | B2 | 12/2014 | Gettings et al. |
| 8,924,241 | B2 | 12/2014 | Grosso |
| 8,930,581 | B2 | 1/2015 | Anton et al. |
| 9,015,238 | B1 | 4/2015 | Anton et al. |
| 9,049,168 | B2 | 6/2015 | Jacob et al. |
| 9,053,516 | B2 | 6/2015 | Stempora |
| 9,082,015 | B2 | 7/2015 | Christopulos et al. |
| 9,141,995 | B1 | 9/2015 | Brinkmann et al. |
| 9,158,869 | B2 | 10/2015 | Labrie et al. |
| 9,165,084 | B2 | 10/2015 | Isberg et al. |
| 9,183,560 | B2 | 11/2015 | Abelow |
| 9,252,980 | B2 | 2/2016 | Raman |
| 9,311,676 | B2 | 4/2016 | Helitzer et al. |
| 9,330,550 | B2 | 5/2016 | Zribi et al. |
| 9,363,322 | B1 | 6/2016 | Anton et al. |
| 9,454,907 | B2 | 9/2016 | Hafeez et al. |
| 9,460,471 | B2 | 10/2016 | Bernard et al. |
| 9,481,459 | B2 | 11/2016 | Staskevich et al. |
| 9,611,038 | B2 | 4/2017 | Dahlstrom |
| 9,613,523 | B2 | 4/2017 | Davidson et al. |
| 9,652,805 | B1 | 5/2017 | Clawson, II et al. |
| 9,665,074 | B2 | 5/2017 | Lentzitzky |
| 9,710,858 | B1 | 7/2017 | Devereaux et al. |
| 9,747,571 | B2 | 8/2017 | Ballew et al. |
| 9,754,325 | B1 | 9/2017 | Konrardy et al. |
| 9,792,656 | B1 | 10/2017 | Konrardy et al. |
| 9,811,862 | B1 | 11/2017 | Allen et al. |
| 9,818,158 | B1 | 11/2017 | Devereaux et al. |
| 9,842,310 | B2 | 12/2017 | Lekas |
| 9,886,723 | B1 | 2/2018 | Devereaux et al. |
| 9,892,463 | B1 | 2/2018 | Hakimi-Boushehri et al. |
| 9,915,438 | B2 * | 3/2018 | Cheatham, III ....... G05B 15/02 |
| 9,934,675 | B2 | 4/2018 | Coyne et al. |
| 9,947,051 | B1 | 4/2018 | Allen et al. |

(56) References Cited

U.S. PATENT DOCUMENTS

| | | |
|---|---|---|
| 9,959,581 B2 | 5/2018 | Pershing |
| 9,984,417 B1 | 5/2018 | Allen et al. |
| 10,032,224 B2 | 7/2018 | Helitzer et al. |
| 10,055,793 B1 | 8/2018 | Call et al. |
| 10,055,794 B1 | 8/2018 | Konrardy et al. |
| 10,121,207 B1 | 11/2018 | Devereaux et al. |
| 10,163,162 B1 | 12/2018 | Devereaux et al. |
| 10,181,159 B1 | 1/2019 | Allen et al. |
| 2002/0007289 A1 | 1/2002 | Malin et al. |
| 2002/0032586 A1 | 3/2002 | Joao |
| 2002/0035528 A1 | 3/2002 | Simpson et al. |
| 2002/0049618 A1 | 4/2002 | McClure et al. |
| 2002/0055861 A1 | 5/2002 | King et al. |
| 2002/0087364 A1 | 7/2002 | Lerner et al. |
| 2002/0103622 A1 | 8/2002 | Burge |
| 2002/0111835 A1 | 8/2002 | Hele et al. |
| 2002/0116254 A1 | 8/2002 | Stein et al. |
| 2002/0129001 A1 | 9/2002 | Levkoff et al. |
| 2002/0178033 A1 | 11/2002 | Yoshioka et al. |
| 2003/0040934 A1 | 2/2003 | Skidmore et al. |
| 2003/0078816 A1 | 4/2003 | Filep |
| 2003/0097335 A1 | 5/2003 | Moskowitz et al. |
| 2003/0182441 A1 | 9/2003 | Andrew et al. |
| 2004/0019507 A1 | 1/2004 | Yaruss et al. |
| 2004/0034657 A1 | 2/2004 | Zambo et al. |
| 2004/0039586 A1 | 2/2004 | Garvey et al. |
| 2004/0046033 A1 | 3/2004 | Kolodziej et al. |
| 2004/0064345 A1 | 4/2004 | Ajamian et al. |
| 2004/0172304 A1 | 9/2004 | Joao |
| 2004/0181621 A1 | 9/2004 | Mathur et al. |
| 2004/0260406 A1 | 12/2004 | Ljunggren et al. |
| 2005/0050017 A1 | 3/2005 | Ross et al. |
| 2005/0055248 A1 | 3/2005 | Helitzer et al. |
| 2005/0055249 A1 | 3/2005 | Helitzer et al. |
| 2005/0057365 A1 | 3/2005 | Qualey |
| 2005/0128074 A1 | 6/2005 | Culpepper et al. |
| 2005/0197847 A1 | 9/2005 | Smith |
| 2005/0226273 A1 | 10/2005 | Qian |
| 2005/0251427 A1 | 11/2005 | Dorai et al. |
| 2005/0278082 A1 | 12/2005 | Weekes |
| 2006/0017558 A1 | 1/2006 | Albert et al. |
| 2006/0026044 A1 | 2/2006 | Smith |
| 2006/0052905 A1 | 3/2006 | Pfingsten et al. |
| 2006/0111874 A1 | 5/2006 | Curtis et al. |
| 2006/0161450 A1 | 7/2006 | Carey et al. |
| 2006/0200008 A1 | 9/2006 | Moore-Ede |
| 2006/0218018 A1 | 9/2006 | Schmitt |
| 2006/0219705 A1 | 10/2006 | Beier et al. |
| 2006/0229923 A1 | 10/2006 | Adi et al. |
| 2006/0235611 A1 | 10/2006 | Deaton et al. |
| 2007/0005400 A1 | 1/2007 | Eggenberger et al. |
| 2007/0005404 A1 | 1/2007 | Raz et al. |
| 2007/0043803 A1 | 2/2007 | Whitehouse et al. |
| 2007/0088579 A1 | 4/2007 | Richards |
| 2007/0100669 A1 | 5/2007 | Wargin et al. |
| 2007/0118399 A1 | 5/2007 | Avinash et al. |
| 2007/0136078 A1 | 6/2007 | Plante |
| 2007/0150319 A1 | 6/2007 | Menendez |
| 2007/0156463 A1 | 7/2007 | Burton et al. |
| 2007/0161940 A1 | 7/2007 | Blanchard et al. |
| 2007/0174467 A1 | 7/2007 | Ballou et al. |
| 2007/0214023 A1 | 9/2007 | Mathai et al. |
| 2007/0282639 A1 | 12/2007 | Leszuk et al. |
| 2007/0299677 A1 | 12/2007 | Maertz |
| 2008/0033847 A1 | 2/2008 | McIntosh |
| 2008/0052134 A1 | 2/2008 | Nowak et al. |
| 2008/0062258 A1* | 3/2008 | Bentkovski ........ H04N 5/23206 348/50 |
| 2008/0065427 A1 | 3/2008 | Helitzer et al. |
| 2008/0077451 A1 | 3/2008 | Anthony et al. |
| 2008/0086320 A1 | 4/2008 | Ballew et al. |
| 2008/0114655 A1 | 5/2008 | Skidmore |
| 2008/0140857 A1 | 6/2008 | Conner et al. |
| 2008/0154651 A1 | 6/2008 | Kenefick et al. |
| 2008/0154686 A1 | 6/2008 | Vicino |
| 2008/0154851 A1 | 6/2008 | Jean |
| 2008/0154886 A1 | 6/2008 | Podowski et al. |
| 2008/0164769 A1 | 7/2008 | Eck |
| 2008/0243558 A1 | 10/2008 | Gupte |
| 2008/0244329 A1 | 10/2008 | Shinbo et al. |
| 2008/0282817 A1 | 11/2008 | Breed |
| 2008/0306799 A1 | 12/2008 | Sopko, III et al. |
| 2008/0307104 A1 | 12/2008 | Amini et al. |
| 2008/0319787 A1 | 12/2008 | Stivoric et al. |
| 2009/0006175 A1 | 1/2009 | Maertz |
| 2009/0024420 A1 | 1/2009 | Winkler |
| 2009/0031175 A1 | 1/2009 | Aggarwal et al. |
| 2009/0109037 A1 | 4/2009 | Farmer |
| 2009/0119132 A1 | 5/2009 | Bolano et al. |
| 2009/0135009 A1 | 5/2009 | Little et al. |
| 2009/0177500 A1 | 7/2009 | Swahn |
| 2009/0188202 A1 | 7/2009 | Vokey |
| 2009/0205054 A1 | 8/2009 | Blotenberg et al. |
| 2009/0216349 A1 | 8/2009 | Kwon et al. |
| 2009/0240531 A1 | 9/2009 | Hilborn |
| 2009/0240550 A1 | 9/2009 | McCarty |
| 2009/0265193 A1 | 10/2009 | Collins et al. |
| 2009/0265207 A1 | 10/2009 | Johnson |
| 2009/0266565 A1 | 10/2009 | Char |
| 2009/0279734 A1 | 11/2009 | Brown |
| 2009/0287509 A1 | 11/2009 | Basak et al. |
| 2010/0030586 A1 | 2/2010 | Taylor et al. |
| 2010/0049552 A1 | 2/2010 | Fini et al. |
| 2010/0131300 A1 | 5/2010 | Collopy et al. |
| 2010/0131307 A1 | 5/2010 | Collopy et al. |
| 2010/0174566 A1 | 7/2010 | Helitzer et al. |
| 2010/0241464 A1 | 9/2010 | Amigo et al. |
| 2010/0274590 A1 | 10/2010 | Compangano et al. |
| 2010/0274859 A1 | 10/2010 | Bucuk |
| 2010/0299161 A1 | 11/2010 | Burdick et al. |
| 2010/0299162 A1 | 11/2010 | Kwan |
| 2011/0043958 A1 | 2/2011 | Nakamura et al. |
| 2011/0061697 A1 | 3/2011 | Behrenbruch et al. |
| 2011/0112848 A1 | 5/2011 | Beraja et al. |
| 2011/0137684 A1 | 6/2011 | Peak et al. |
| 2011/0137685 A1 | 6/2011 | Tracy et al. |
| 2011/0137885 A1 | 6/2011 | Isberg et al. |
| 2011/0161117 A1 | 6/2011 | Busque et al. |
| 2011/0161119 A1 | 6/2011 | Collins |
| 2011/0295624 A1 | 12/2011 | Chapin et al. |
| 2011/0320226 A1 | 12/2011 | Graziano et al. |
| 2012/0004935 A1 | 1/2012 | Winkler |
| 2012/0016695 A1 | 1/2012 | Bernard et al. |
| 2012/0022897 A1 | 1/2012 | Shafer |
| 2012/0025994 A1 | 2/2012 | Morris |
| 2012/0028635 A1 | 2/2012 | Borg et al. |
| 2012/0028835 A1 | 2/2012 | Wild et al. |
| 2012/0046975 A1 | 2/2012 | Stolze |
| 2012/0072240 A1 | 3/2012 | Grosso et al. |
| 2012/0096149 A1 | 4/2012 | Sunkara et al. |
| 2012/0101855 A1 | 4/2012 | Collins et al. |
| 2012/0116820 A1 | 5/2012 | English et al. |
| 2012/0130751 A1 | 5/2012 | McHugh et al. |
| 2012/0143634 A1 | 6/2012 | Beyda et al. |
| 2012/0158436 A1 | 6/2012 | Bauer et al. |
| 2012/0176237 A1 | 7/2012 | Tabe |
| 2012/0215568 A1 | 8/2012 | Vahidi et al. |
| 2012/0290333 A1 | 11/2012 | Birchall |
| 2012/0311053 A1 | 12/2012 | Labrie et al. |
| 2012/0311614 A1 | 12/2012 | DeAnna et al. |
| 2012/0323609 A1 | 12/2012 | Fini |
| 2013/0006608 A1 | 1/2013 | Dehors et al. |
| 2013/0018936 A1 | 1/2013 | DAmico et al. |
| 2013/0040636 A1 | 2/2013 | Borg et al. |
| 2013/0040836 A1 | 2/2013 | Himmler et al. |
| 2013/0055060 A1 | 2/2013 | Folsom et al. |
| 2013/0060583 A1 | 3/2013 | Collins et al. |
| 2013/0073303 A1 | 3/2013 | Hsu |
| 2013/0144658 A1 | 6/2013 | Schnabolk et al. |
| 2013/0144858 A1 | 6/2013 | Lin et al. |
| 2013/0182002 A1 | 7/2013 | Macciola et al. |
| 2013/0185716 A1 | 7/2013 | Yin et al. |
| 2013/0197945 A1 | 8/2013 | Anderson |
| 2013/0201018 A1 | 8/2013 | Horstemeyer et al. |

(56) References Cited

U.S. PATENT DOCUMENTS

| | | | |
|---|---|---|---|
| 2013/0226623 A1 | 8/2013 | Diana et al. | |
| 2013/0226624 A1 | 8/2013 | Blessman et al. | |
| 2013/0245796 A1 | 9/2013 | Lentzitzky et al. | |
| 2013/0253961 A1 | 9/2013 | Feldman et al. | |
| 2013/0268358 A1 | 10/2013 | Haas | |
| 2013/0282408 A1 | 10/2013 | Snyder et al. | |
| 2013/0317732 A1 | 11/2013 | Borg et al. | |
| 2014/0040343 A1 | 2/2014 | Nickolov et al. | |
| 2014/0046701 A1 | 2/2014 | Steinberg et al. | |
| 2014/0050147 A1 | 2/2014 | Beale | |
| 2014/0058761 A1 | 2/2014 | Freiberger et al. | |
| 2014/0067137 A1 | 3/2014 | Amelio et al. | |
| 2014/0081675 A1 | 3/2014 | Ives et al. | |
| 2014/0089156 A1 | 3/2014 | Williams et al. | |
| 2014/0089990 A1 | 3/2014 | van Deventer et al. | |
| 2014/0108275 A1 | 4/2014 | Heptonstall | |
| 2014/0114693 A1 | 4/2014 | Helitzer et al. | |
| 2014/0114893 A1 | 4/2014 | Arthur et al. | |
| 2014/0123292 A1 | 5/2014 | Schmidt et al. | |
| 2014/0123309 A1 | 5/2014 | Jung et al. | |
| 2014/0132409 A1 | 5/2014 | Billman et al. | |
| 2014/0136242 A1* | 5/2014 | Weekes | G06Q 40/08 705/4 |
| 2014/0142989 A1 | 5/2014 | Grosso | |
| 2014/0149485 A1 | 5/2014 | Sharma et al. | |
| 2014/0180723 A1 | 6/2014 | Cote et al. | |
| 2014/0192646 A1 | 7/2014 | Mir et al. | |
| 2014/0195272 A1 | 7/2014 | Sadiq et al. | |
| 2014/0201072 A1 | 7/2014 | Reeser et al. | |
| 2014/0201315 A1 | 7/2014 | Jacob et al. | |
| 2014/0214458 A1 | 7/2014 | Vahidi et al. | |
| 2014/0257862 A1 | 9/2014 | Billman et al. | |
| 2014/0257863 A1 | 9/2014 | Maastricht et al. | |
| 2014/0266669 A1 | 9/2014 | Fadell et al. | |
| 2014/0270492 A1 | 9/2014 | Christopulos et al. | |
| 2014/0278573 A1 | 9/2014 | Cook | |
| 2014/0279593 A1 | 9/2014 | Pershing | |
| 2014/0280457 A1 | 9/2014 | Anton et al. | |
| 2014/0304007 A1 | 10/2014 | Kimball et al. | |
| 2014/0316614 A1 | 10/2014 | Newman | |
| 2014/0322676 A1 | 10/2014 | Raman | |
| 2014/0327995 A1 | 11/2014 | Panjwani et al. | |
| 2014/0334492 A1 | 11/2014 | Mack-Crane | |
| 2014/0358592 A1 | 12/2014 | Wedig et al. | |
| 2014/0371941 A1 | 12/2014 | Keller et al. | |
| 2014/0375440 A1 | 12/2014 | Rezvani et al. | |
| 2014/0380264 A1 | 12/2014 | Misra et al. | |
| 2015/0006206 A1 | 1/2015 | Mdeway | |
| 2015/0019266 A1 | 1/2015 | Stempora | |
| 2015/0025915 A1 | 1/2015 | Lekas | |
| 2015/0025917 A1 | 1/2015 | Stempora | |
| 2015/0026074 A1 | 1/2015 | Cotten | |
| 2015/0112504 A1 | 4/2015 | Binion et al. | |
| 2015/0154709 A1 | 6/2015 | Cook | |
| 2015/0154712 A1 | 6/2015 | Cook | |
| 2015/0161738 A1 | 6/2015 | Stempora | |
| 2015/0221051 A1 | 8/2015 | Settino | |
| 2015/0332407 A1 | 11/2015 | Wilson et al. | |
| 2015/0339911 A1 | 11/2015 | Coyne et al. | |
| 2015/0370272 A1 | 12/2015 | Reddy et al. | |
| 2015/0372832 A1 | 12/2015 | Kortz et al. | |
| 2016/0005130 A1 | 1/2016 | Devereaux et al. | |
| 2016/0039921 A1 | 2/2016 | Luo et al. | |
| 2016/0055594 A1 | 2/2016 | Emison | |
| 2016/0067547 A1 | 3/2016 | Anthony et al. | |
| 2016/0104250 A1 | 4/2016 | Allen et al. | |
| 2016/0125170 A1 | 5/2016 | Abramowitz | |
| 2016/0163186 A1 | 6/2016 | Davidson et al. | |
| 2016/0225098 A1 | 8/2016 | Helitzer et al. | |
| 2017/0178424 A1 | 6/2017 | Wright | |
| 2017/0365008 A1 | 12/2017 | Schreier et al. | |
| 2018/0033087 A1* | 2/2018 | Delinselle | G06Q 40/08 |

FOREIGN PATENT DOCUMENTS

| | | |
|---|---|---|
| CA | 2518482 C | 3/2007 |
| CA | 2805226 A1 | 8/2013 |
| CA | 2882086 A1 | 2/2014 |
| CN | 103203054 B | 7/2013 |
| DE | 102005015028 B4 | 10/2006 |
| DE | 102008008317 A1 | 8/2009 |
| EP | 722145 A1 | 7/1996 |
| EP | 0722145 A1 | 7/1996 |
| EP | 1790057 B1 | 5/2012 |
| EP | 2795757 A4 | 10/2014 |
| EP | 2276135 B1 | 4/2015 |
| EP | 3255613 A1 | 12/2017 |
| GB | 2449510 A | 11/2008 |
| JP | 3282937 B2 | 5/2002 |
| JP | 2002358425 A | 12/2002 |
| JP | 2008250594 A | 10/2008 |
| KR | 20090090461 A | 8/2009 |
| MX | 337513 B | 8/2009 |
| RU | 2015109725 A | 10/2016 |
| WO | 2004034232 A2 | 4/2004 |
| WO | 2006074682 A2 | 7/2006 |
| WO | 2010136163 A1 | 12/2010 |
| WO | 2012075442 A1 | 6/2012 |
| WO | 2013/036677 A1 | 3/2013 |
| WO | 2013036677 A1 | 3/2013 |

OTHER PUBLICATIONS

"Truck Crash Event Data Recorder Downloading," Crash Forensic; 2012, pp. 1-25.

Aiyagar, Sanjay et al., "AMQP Message Queuing Protocol Specification," Version Dec. 9, 2006. https://www.rabbitmq.com/resources/specs/amqp0-9.

Amanda Love, "How Recoverable Depreciation Works", Aug. 6, 2012, http://www.stateroofingtexas.com/recoverable-depreciation-works/.

AMQP is the Internet Protocol for Business Messaging Website. Jul. 4, 2011. https://web.archive.org/web/20110704212632/http://www.amqp.org/about/what.

Cloudera.com, "Migrating from MapReduce 1 (MRv1) to Map Reduce 2 (MRv2, YARN)", https://www.cloudera.com/documentation/enterprise/5-9-x/topics/cdh_ig_mapreduce_to_yarn_migrate.html, page generated Feb. 6, 2018.

Corbett et al., "Spanner: Google's Globally-Distributed Database," Google, Inc., pp. 1-14, 2012.

Das, Sudipto et al., "Ricardo: Integrating R and Hadoop," IBM Almaden Research Center, SIGMOD'10, Jun. 6-11, 2010.

Dean et al., "A New Age of Data Mining in the High-Performance World," SAS Institute Inc., 2012.

Deerwester et al., "Indexing by Latent Semantic Analysis," Journal of the American Society for Information Science, 1990.41 (6), pp. 391-407.

Fong et al., "Toward a scale-out data-management middleware for low-latency enterprise computing," IBM J. Res & Dev. vol. 57, No. 3/4 Paper, May 6/Jul. 2013.

Glennon, Jr., John C.; "Motor Vehicle Crash Investigation and Reconstruction," BSAT, 2001, 4 pgs.

Hopkins, Brian, "Big Opportunities in Big Data Positioning Your Firm to Capitalize in a Sea of Information," Enterprise Architecture Professionals, Forrester Research, Inc., pp. 1-9, May 2011.

Iwasaki, Yoji; Yamazaki, Fumimo, Publication Info: 32nd Asian Conference on Remote Sensing 2011, ACRS 2011 1: 550-555 Asian Association on Remote Sensing. (Dec. 1, 2011) (Year: 2011).

Kopp et al., "Full-scale testing of low-rise, residential buildings with realistic wind loads", 2012, 15 pages.

McKeown et al., "OpenFlow: Enabling Innovation in Campus Networks," pp. 1-6, Mar. 14, 2008.

Melnik, Sergey et al., "Dremel: Interactive Analysis of Web-Scale Datasets," 36th International Conference on Very Large Data Bases, Sep. 13-17, 2010, Singapore, Proceedings of the VLDB Endowment, vol. No. 1.

(56) References Cited

OTHER PUBLICATIONS

NYSE Technologies Website and Fact Sheet for Data Fabric 6.0 Aug. 2011, https://web.archive.org/web/20110823124532/http://nysetechnologies.nyx.com/data-technology/data-fabric-6-0.
Richardson, Alexis, "Introduction to RabbitMQ, An Open Source Message Broker That Just Works," Rabbit MQ, Open Source Enterprise Messaging, pp. 1-36, May 13, 2009.
Stefan Theußl, "Applied High Performance Computing Using R," Diploma Thesis, Univ. Prof, Dipl, Ing. Dr. Kurt Hornik, pp. 1-126, Sep. 27, 2007.
STIC search dated Jan. 4, 2019 (Year 2019).
Wang, Guohul et al., "Programming Your Network at Run-time for Big Data Applications," IBM T.J. Watson Research Center, Rice University, HotSDN'12, Aug. 13, 2012, Helsinki, Finland.
Wang, Jianwu et al., "Kepler + Hadoop: A General Architecture Facilitating Data-Intensive Applications in Scientific Workflow Systems," Works 09, Nov. 15, 2009, Portland, Oregon, USA.
Webb, Kevin C. et al., "Topology Switching for Data Center Networks," Published in: Proceeding Hot-ICE'11 Proceedings of the 11th USENIX conference on Hot topics in management of Internet, cloud, and enterprise networks and services, Mar. 29, 2011.
Xi et al., "Enabling Flow-Based Routing Control in Data Center Networks using Probe and ECMP," Polytechnic Institute of New York University, IEE INFOCOM 2011, pp. 614-619.
T. Sanidas et al., U.S. Appl. No. 61/800,561, filed Mar. 15, 2013, Specification, 29 pages.
Telematics Set the Stage the Improved Auto Claims Management by Sam Friedman (Oct. 10, 2012); 3 pages.
U.S. Appl. No. 61/800,561, Sanidas et al., filed Mar. 15, 2013.
U.S. Appl. No. 61/866,779, Bergner, filed Aug. 16, 2013.
U.S. Appl. No. 61/926,091, Allen et al., filed Jan. 10, 2014.
U.S. Appl. No. 61/926,093, Allen et al., filed Jan. 10, 2014.
U.S. Appl. No. 61/926,095, Allen et al., filed Jan. 10, 2014.
U.S. Appl. No. 61/926,098, Allen et al., filed Jan. 10, 2014.
U.S. Appl. No. 61/926,103, Devereaux et al., filed Jan. 10, 2014.
U.S. Appl. No. 61/926,108, Allen et al., filed Jan. 10, 2014.
U.S. Appl. No. 61/926,111, Allen et al., filed Jan. 10, 2014.
U.S. Appl. No. 61/926,114, Devereaux et al., filed Jan. 10, 2014.
U.S. Appl. No. 61/926,118, Devereaux et al., filed Jan. 10, 2014.
U.S. Appl. No. 61/926,119, Devereaux et al., filed Jan. 10, 2014.
U.S. Appl. No. 61/926,121, Devereaux et al., filed Jan. 10, 2014.
U.S. Appl. No. 61/926,123, Devereaux et al., filed Jan. 10, 2014.
U.S. Appl. No. 61/926,532, Allen et al., filed Jan. 13, 2014.
U.S. Appl. No. 61/926,534, Allen et al., filed Jan. 13, 2014.
U.S. Appl. No. 61/926,536, Allen et al., filed Jan. 13, 2014.
U.S. Appl. No. 61/926,541, Allen et al., filed Jan. 13, 2014.
U.S. Appl. No. 61/943,897, Devereaux et al., filed Feb. 24, 2014.
U.S. Appl. No. 61/943,901, Devereaux et al., filed Feb. 24, 2014.
U.S. Appl. No. 61/943,906, Devereaux et al., filed Feb. 24, 2014.
U.S. Appl. No. 61/948,192, Davis et al., filed Mar. 5, 2014.
U.S. Appl. No. 62/311,491, Moy, filed Mar. 22, 2016.
U.S. Appl. No. 62/325,250, Rodgers et al., filed Apr. 20, 2016.
U.S. Appl. No. 62/351,427, Devereaux et al., filed Jun. 17, 2016.
U.S. Appl. No. 62/351,441, Flachsbart et al., filed Jun. 17, 2016.
U.S. Appl. No. 62/351,451, Chavez et al., filed Jun. 17, 2016.
Zevnik, Richard. The Complete Book of Insurance. Sphinx. 2004. pp. 76-78.
U.S. Appl. No. 14/251,377, filed Apr. 11, 2014, Devereaux et al.
U.S. Appl. No. 14/251,392, filed Apr. 11, 2014, Allen et al.
U.S. Appl. No. 14/251,404, filed Apr. 11, 2014, Devereaux et al.
U.S. Appl. No. 14/251,411, filed Apr. 11, 2014, Allen et al.
U.S. Appl. No. 14/273,877, filed May 9, 2014, Allen et al.
U.S. Appl. No. 14/273,889, filed May 9, 2014, Devereaux et al.
U.S. Appl. No. 14/273,918, filed May 9, 2014, Allen et al.
U.S. Appl. No. 14/278,182, filed May 15, 2014, Allen et al.
U.S. Appl. No. 14/278,202, filed May 15, 2014, Allen et al.
U.S. Appl. No. 14/303,336, filed Jun. 12, 2014, Devereaux et al.
U.S. Appl. No. 14/303,347, filed Jun. 12, 2014, Devereaux et al.
U.S. Appl. No. 14/303,370, filed Jun. 12, 2014, Allen et al.
U.S. Appl. No. 14/303,382, filed Jun. 12, 2014, Allen et al.
U.S. Appl. No. 14/305,732, filed Jun. 16, 2014, Devereaux et al.
U.S. Appl. No. 14/324,534, filed Jul. 7, 2014, Devereaux et al.
U.S. Appl. No. 14/324,546, filed Jul. 7, 2014, Devereaux et al.
U.S. Appl. No. 14/324,609, filed Jul. 7, 2014, Devereaux et al.
U.S. Appl. No. 14/324,618, filed Jul. 7, 2014, Devereaux et al.
U.S. Appl. No. 14/324,748, filed Jul. 7, 2014, Devereaux et al.
U.S. Appl. No. 14/324,759, filed Jul. 7, 2014, Devereaux et al.
U.S. Appl. No. 14/494,207, filed Sep. 23, 2014, Campbell.
U.S. Appl. No. 14/572,413, filed Dec. 16, 2014, Devereaux et al.
U.S. Appl. No. 14/573,981, filed Dec. 15, 2014, Allen et al.
U.S. Appl. No. 14/862,776, filed Sep. 23, 2015, Devereaux et al.
U.S. Appl. No. 14/941,225, filed Nov. 13, 2015, Billman et al.
U.S. Appl. No. 14/941,262, filed Nov. 13, 2015, Hopkins et al.
U.S. Appl. No. 15/244,847, filed Aug. 23, 2016, Devereaux et al.
U.S. Appl. No. 15/365,555, filed Nov. 30, 2016, Devereaux et al.
U.S. Appl. No. 15/365,611, filed Nov. 30, 2016, Devereaux et al.
U.S. Appl. No. 15/365,676, filed Nov. 30, 2016, Devereaux et al.
U.S. Appl. No. 15/365,706, filed Nov. 30, 2016, Devereaux et al.
U.S. Appl. No. 15/365,721, filed Nov. 30, 2016, Devereaux et al.
U.S. Appl. No. 15/365,725, filed Nov. 30, 2016, Devereaux et al.
U.S. Appl. No. 15/365,736, filed Nov. 30, 2016, Devereaux et al.
U.S. Appl. No. 15/365,745, filed Nov. 30, 2016, Devereaux et al.
U.S. Appl. No. 15/365,754, filed Nov. 30, 2016, Devereaux et al.
U.S. Appl. No. 15/365,764, filed Nov. 30, 2016, Devereaux et al.
U.S. Appl. No. 15/365,773, filed Nov. 30, 2016, Devereaux et al.
U.S. Appl. No. 15/365,786, filed Nov. 30, 2016, Devereaux et al.
Farmers Next Generation Homeowners Policy, Missouri, by Farmers insurance Exchange; 2008; 50 pages.
Gonzalez Ribeiro, Ana, "Surprising things your home insurance covers," Jan. 12, 2012 in Insurance; 4 pages.

\* cited by examiner

ELECTRONIC SENSOR MANAGEMENT

CROSS REFERENCE TO RELATED APPLICATIONS

This application is a Continuation-in-Part of U.S. patent application Ser. No. 15/724,103, filed on Oct. 3, 2017, which is a Continuation Application of U.S. patent application Ser. No. 14/303,382, filed Jun. 12, 2014, which claims priority to U.S. Provisional Patent Application Ser. Nos.: 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014, all of which are incorporated herein by reference in their entirety.

TECHNICAL FIELD

The disclosed embodiments generally relate to a method and computerized system for managing electronic sensors.

BACKGROUND

Smart home technology refers to control and even automation of different house functionalities, such as lighting, heating, ventilation, air conditioning (HVAC), and security, as well as home appliances such as washer/dryers, ovens or refrigerators/freezers or even home entertainment system. Homeowners may install several sensors (each configured to collect a certain type of data) and may monitor different aspects and functionalities within their homes. For example, a homeowner may install a smart thermostat, which monitors temperature patterns and may even adjust the temperature of the house based on the detected pattern.

As the smart home technology has advanced recently, several technical challenges have also been identified. For instance, conventional smart home software solutions provide a single category solution with limited intra-communication ability. For example, a smart thermostat may determine a temperature pattern or adjust the temperature; however, (due to technical challenges) the smart thermostat may not be able to communicate with other sensors. In another example, a motion detector (configured to use infrared technology and detect motion and heat) may monitor movement and alert the homeowner when it detects movement within the house. However, the motion sensor is not in communication with other sensors (such as camera sensors) and may provide erroneous alerts simply because it detects motions. Furthermore, existing and conventional methods do not provide a method for a central server to receive data from the motion sensor, activate a camera sensor, and verify the data received form the motion sensor. Existing and conventional methods fail to provide fast and efficient analysis of building condition data and fail to provide effective communication between different sensors due to a high volume of building condition data captured by different sensors on different networks and/or computing infrastructures. Managing such information is difficult due to data type, size, or content associated with different sensors.

SUMMARY OF THE INVENTION

For the aforementioned reasons, there is a need for a central server to actively communicate with different sensors, analyze the data, and further control the functional behavior of one or more sensors. This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

In an embodiment, a method comprises receiving, by a server, a set of building condition data from a motion sensor device associated with a building and connected to a network of the building, wherein the set of building condition data comprises at least a heat map indicating presence of one or more inhabitants within the building; upon receiving the set of building condition data, generating a first instruction commanding an immediate capture of an image; upon transmitting the first instructions to a camera sensor device connected to the network of the building, receiving, by the server, at least one image captured by the camera sensor device; identifying, by the server, at least one inhabitant present within the building based on the set of building condition data and the at least one image received; retrieving, by the server, profile data corresponding to the identified inhabitant present within the building, the profile data comprising at least an environmental preference value of the identified inhabitant's; generating, by the server, a second instruction in accordance with the environmental preference value; and transmitting, by the server, the second instruction to one or more environmental devices coupled to the network of the building, whereby the second instructions commands the one or more environmental devices to modify environmental condition of the building in accordance with the environmental preference value.

In another embodiment, a computer system comprising: a plurality of home sensors devices connected to a network of a building and configured to collect building condition data, wherein the plurality of home sensor devices comprises at least a camera sensor device and a motion sensor device; one or more environmental devices coupled to the network of the building and configured to modify environmental conditions of the building; and a server connected to the network and in connection with the one or more environmental devices and the plurality of home sensors devices, wherein the server is configured to: receive a set of building condition data from the motion sensor device associated with the building and connected to the network of the building, wherein the set of building condition data comprises at least a heat map indicating presence of one or more inhabitants within the building; upon receiving the set of building condition data, generate a first instruction commanding an immediate capture of an image; upon transmitting the first instructions to the camera sensor device connected to the network of the building, receive at least one image captured by the camera sensor device; identify at least one inhabitant present within the building based on the set of building condition data and the at least one image received; retrieve profile data corresponding to the identified inhabitant present within the building, the profile data comprising at least an environmental preference value of the identified inhabitant's; generate a second instruction in accordance with the environmental preference value; and transmit the second instruction to one or more environmental devices coupled to the network of the building, whereby the second instructions commands the one or more environmental devices to modify environmental condition of the building in accordance with the environmental preference value.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
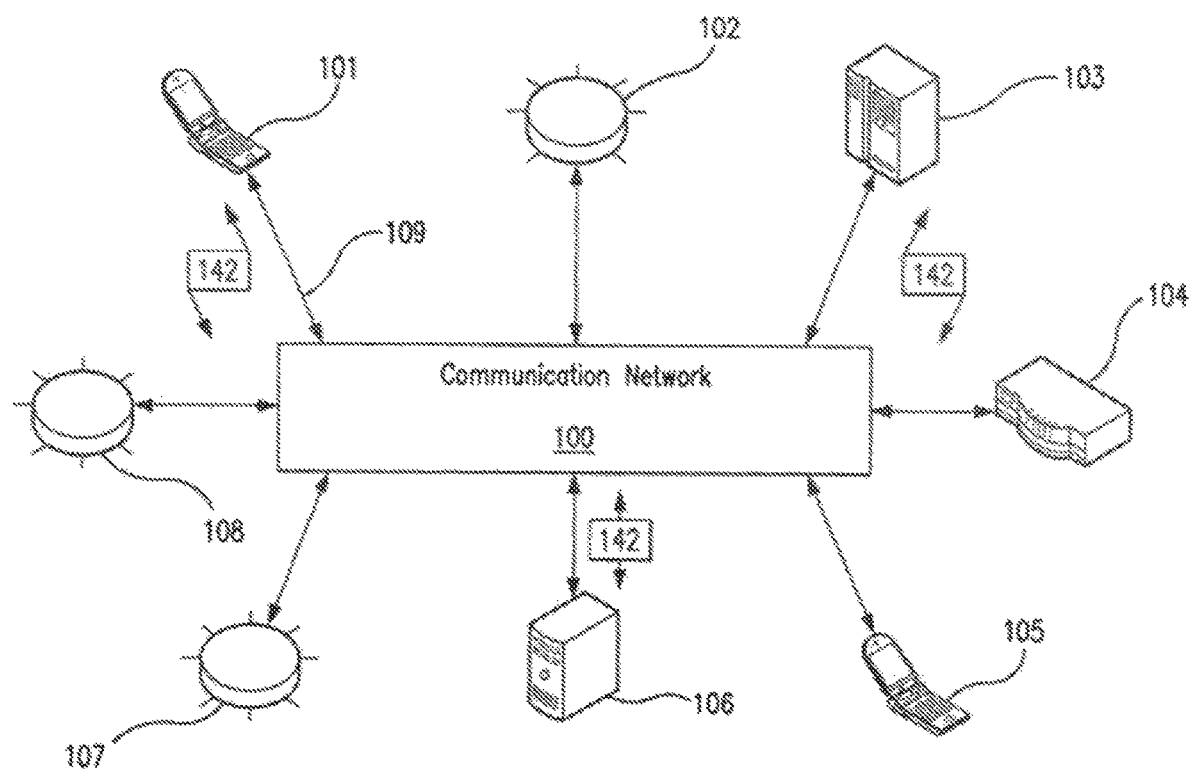
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to employ the discussed embodiments. Furthermore, the terms and phrases used herein are not intended to be limiting but rather to provide an understandable description of the illustrated embodiments.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety.

Turning now descriptively to the drawings, FIG. 1 depicts an exemplary communications network 100 in which below illustrated embodiments may be implemented. It is to be understood a communication network 100 is a geographically distributed collection of nodes interconnected by communication links and segments for transporting data packets between end nodes, such as personal computers, workstations, smart phone devices, tablets, televisions, home sensors, and/or other devices such as automobiles, etc. Many types of networks are available, with the types ranging from local area networks (LANs) to wide area networks (WANs). LANs typically connect the nodes over dedicated private communications links located in the same general physical location, such as a property 300. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

FIG. 1 is a schematic block diagram of a communication network 100 illustratively comprising nodes/devices 101-108 (e.g., sensors 102, the computing server device 103, smart phone devices 101 and 105, management server 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Any number of nodes, devices, links, etc. may be used in the computer network, and that the view shown herein is for simplicity. Additionally, while the embodiments are shown herein with reference to a general network cloud, the description herein is not so limited, and may be applied to networks that are hardwired.

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
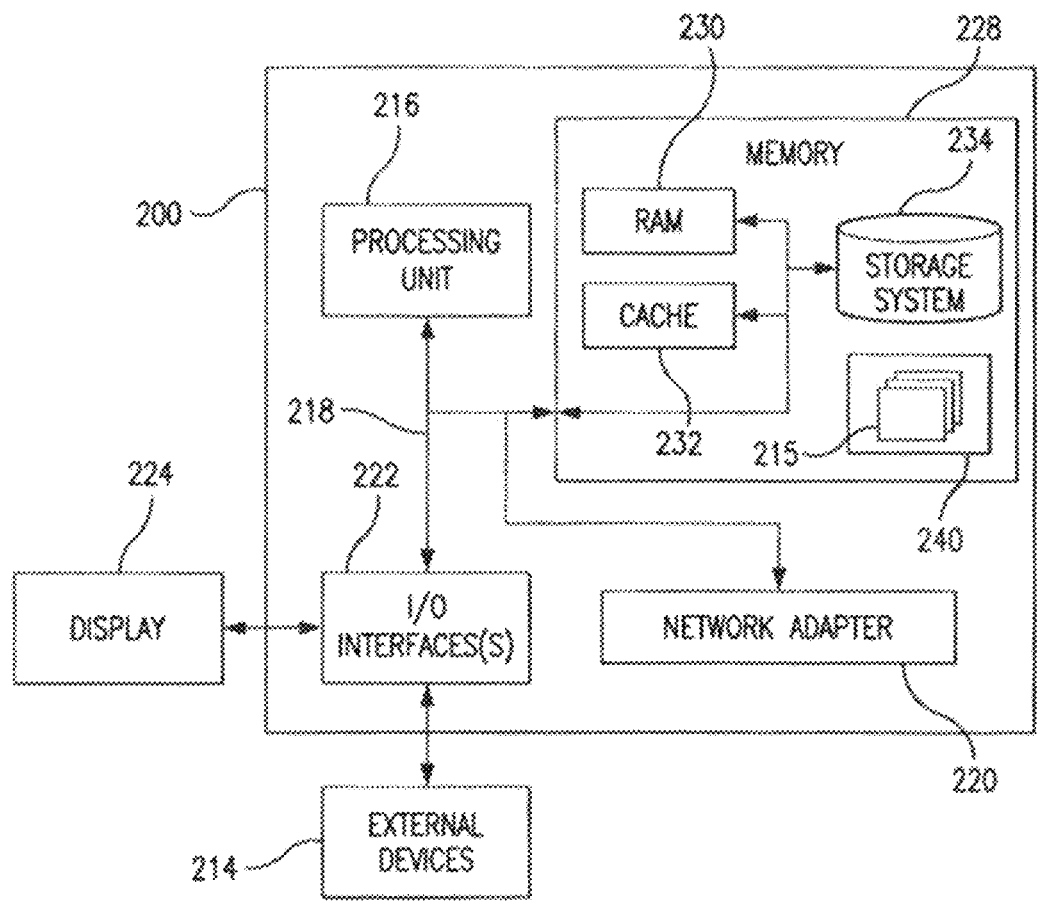
FIG. 2 illustrates one or more network computer devices/nodes, in accordance with an illustrated embodiment.

FIG. 2 is a schematic block diagram of an example computing server device 200 (e.g., one of network devices 101-108 described in FIG. 1) that may be used (or components thereof) with one or more embodiments described herein, e.g., as one of the nodes shown in the communication network 100. As explained above, in different embodiments these various devices may be configured to communicate with each other in any suitable way, such as, for example, via communication network 100. Computing server device 200 is only one example of a suitable system and is not intended to suggest any limitation as to the scope of use or functionality of embodiments of the invention described herein. Regardless, computing network device 200 is capable of being implemented and/or performing any of the functionality set forth herein. In a non-limiting example, computing server device 200 may depict the operational modules of the computing server device 103 described in FIG. 1.

Computing server device 200 is operational with numerous other general purpose or special purpose computing system environments or configurations. Examples of well-known computing systems, environments, and/or configurations that may be suitable for use with computing server device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing server device 200 may be described in the general context of computer system-executable instructions, such as program modules, being executed by a computer system. Generally, program modules may include routines, programs, objects, components, logic, data structures, and so on that perform particular tasks or implement particular abstract data types. Computing server device 200 may be practiced in distributed data processing environments where tasks are performed by remote processing devices that are linked through a communications network. In a distributed data processing environment, program modules may be located in both local and remote computer system storage media including memory storage devices.

The components of computing device 200 may include, but are not limited to, one or more processors or processing units 216, a system memory 228, and a bus 218 that couples various system components including system memory 228 to processing unit 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by computing device 200, and it includes both volatile and non-volatile media, removable and non-removable media. System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, the system memory 228 may include at least one program product having a set (e.g., at least one) of program modules that are configured to carry out the functions of embodiments of the invention.

Program/utility 240, having a set (at least one) of program modules 215, such as analyzer module 306 and the profile engine 308 described below, may be stored in the system memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Computing server device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, computing device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with computing device 200. Examples, include, but are not limited to microcode, device drivers, redundant processing units, external disk drive arrays, RAID systems, tape drives, and data archival storage systems, etc.

FIG. 1 and FIG. 2 are intended to provide a brief, general description of an illustrative and/or suitable exemplary environment in which embodiments of the below described present invention may be implemented. FIG. 1 and FIG. 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
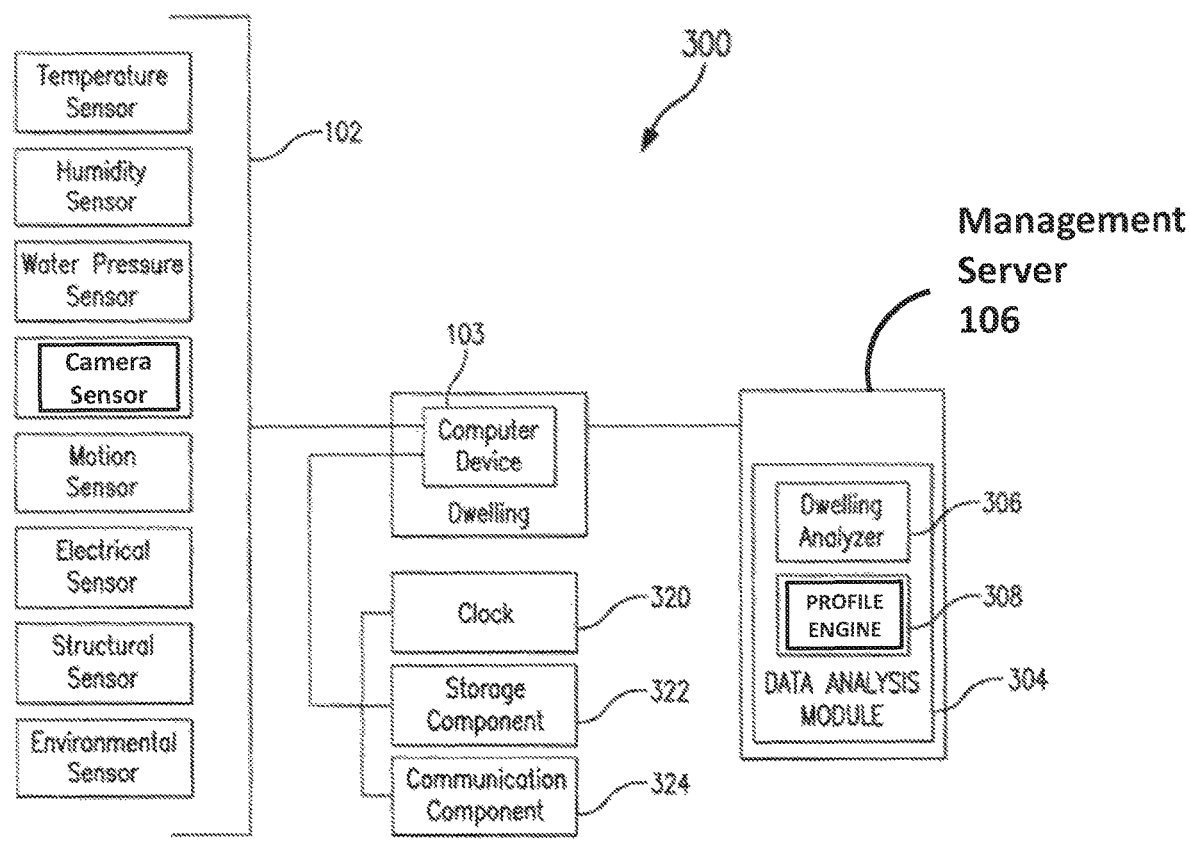
FIG. 3 illustrates a block diagram of a property from which sensor data is captured for subsequent analysis, in accordance with an illustrated embodiment.

With the exemplary communication network 100 (FIG. 1) and computing server device 200 (FIG. 2) being generally shown and discussed above, description of certain illustrated embodiments of the present invention will now be provided. With reference now to FIG. 3, an example of a property 300 is shown, which is to be understood to be any type of property structure (e.g., residential, commercial, retail, municipal, etc.) in which the capture and analysis of sensor data (102) is useful for the reasons at least described below. Property 300 preferably includes a computing server device 103 for capturing data from a plurality of sensors 102, which capture data regarding various aspects of property 300 (e.g., building condition data), as further described below. It is to be understood computing server device 103 may be located in any location, and its position is not limited to the example shown.

Computing server device 103 is preferably configured and operational to receive (capture) data from various sensors 102 regarding certain aspects (including functional and operational) of property 300 (described further below) and transmit that captured data to a management server 106 (remote or installed on site), via the communication network 100. Computing server device 103 may perform analytics regarding the captured sensor data regarding property 300 and/or the remote management server 106 may perform such analytics, as also further described below. In some embodiments, data from sensors 102 may be transmitted directly to the management server 106, via the communication network 100 or any other suitable data transfer means, thus either obviating the need for computing server device 103 or mitigating its functionality to capture all data from sensors 102.

In the illustrated embodiment of FIG. 3, computing server device 103 is shown coupled to various below described sensor types 102. Although various sensor types 102 are described below and shown in FIG. 3, the sensor types described and shown herein are not intended to be exhaustive as embodiments of the present invention may encompass any type of known or unknown sensor type, which facilitates the purposes and objectives of the certain illustrated embodiments described herein. It is to be understood and appreciated, in accordance with the embodiments herein, sensors 102 are preferably installed, and its data is collected, maintained, accessed and otherwise utilized pursuant to the permission of the homeowners subject to appropriate security and privacy concerns. Exemplary sensor types include (but are not limited to):

Temperature sensor—configured and operational to preferably detect the temperature present at the property 300. For example, the temperature may rise and fall with the change of seasons and/or the time of day. Moreover, in the event of a fire, the temperature present at the property 300 may rise quickly—possibly to a level of extreme high heat. The temperature sensor may make use of probes placed at various locations in and around the property 300, in order to collect a representative profile of the temperature present at the property 300. These probes may be connected to the computing server device 103 by wire, or by a wireless technology. For example, if the computing server device 103 is positioned in the attic of the property 300, the temperature may be higher than the general temperature present in the property. Thus, probes placed at various locations (e.g., in the basement, on the various levels of a multi-level property 300, in different rooms that receive different amounts of sun, etc.), in order to obtain an accurate picture of the temperature present at the property. Moreover, the computing server device 103 may record both the indoor and outdoor temperature present at the property 300. For example, data regarding the indoor temperature, the outdoor temperature, and/or the differential between indoor and outdoor temperatures, may be used as part of some analysis model, and thus all of the different values could be stored. The computing server device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the property 300. Humidity sensor may comprise the humidity-detection hardware, or may employ one or more remote probes, which may be located inside and/or outside the property 300. Humidity readings from one or more locations inside and/or outside the property could thus be recorded by computing server device 103.

Water Sensor(s)/Water pressure sensor(s) —configured and operational to preferably monitor water related conditions, including (but not limited to): the detection of water and water pressure detection, for instance in the plumbing system in the property 300. With regards to a water pressure sensor, it may have one or more probes attached to various locations of the property's 300 plumbing, and thus computing server device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, the computing server device 103 may record the water pressure (and water flow) that is present in the plumbing system at various points in time.

Wind speed sensor—configured and operational to record the wind speed present at the property 300. For example, one or more wind sensors may be placed outside the property 300, at the wind speed and/or direction may be recorded at various points in time. Computing server device 103 may record these wind speed and/or wind direction readings. The wind speed may be used by an analysis model to plan for future losses and/or to make underwriting, pricing, or other decisions.

Motion sensor—configured and operational to sense motion in the property 300 to which motion sensor 102 is attached. Typically, property's 300 do not move significantly, except in the event of a catastrophe. Motion sensor may indicate that the property 300 is sliding down a hill (e.g., in the event of an extreme flood or mudslide), or is experiencing a measurable earthquake. A motion sensor may further include earth sensors for detecting sinkholes and earth movement. In addition, a motion sensor may be configured and operational to sense the motion of objects within the property. In some embodiments, the motion sensor may utilize micro-location technology to detect presence of inhabitants within the property 300. In other embodiments, the motion sensor may use infrared technology to detect heat sources moving within the property 300. For example, the motion sensor 102 may capture an infrared heat map (e.g., capture the infrared radiation) of the property, which may illustrates warm bodies within the property 300.

Electrical system sensor/analyzer configured and operational to assess the condition of the property's 300 electrical system. For example, potentiometers may be connected to various points in the property's 300 electrical system to measure voltage. Readings from the potentiometers could be used to determine if the voltage is persistently too high, or too low, or if the voltage frequently drops and/or spikes. Such conditions may suggest that the property 300 is at risk for fire. Other types of electrical measurements could be taken, such as readings of current flowing through the electrical system. Any type of data about the property's 300 electrical system could be captured by computing server device 103.

Camera Sensor—Camera sensors include visible light cameras, infrared cameras, two-dimensional (2D) cameras, three-dimensional (3D) cameras, thermal cameras, aerial imagery cameras, Smartphone camera images, radar-capable sensors, sensors that detect other wavelengths, and/or any combination thereof. In some embodiments, the camera sensor 102 may capture and transmit low-resolution images of different areas within the property 300 to the computing server device 103 or directly to a third party server. Threes images may be used (in conjunction with facial recognition software and technology) to determine the identity of the inhabitants within the property 300. In some embodiments, the camera may be configured to capture images within a field of vision, which is controllable via instructions received from the management server 106 and/or the computing server device 103.

Structural sensor—configured and operational to preferably detect various structural conditions relating to property 300. A structural sensor may comprise detection hardware, or may employ one or more remote probes, which may be located inside and/or outside the property 300. Conditions recorded by structural sensor may include (but are not limited to) the condition of the wall structure, floor structure, ceiling structure and roof structure of property 300, which may be achieved via: load bearing detectors; components which measure the slope of a floor/wall/ceiling; carpet conditions (e.g., via nano sensor) or any other components functional to detect such conditions. Structural readings from one or more locations inside and/or outside the property 300 could thus be recorded by computing server device 103 and used by an analysis model in various ways.

Environmental Sensor—configured and operational to preferably detect various environmental conditions relating to property 300. An environmental sensor may comprise detection hardware, or may employ one or more remote probes, which may be located inside and/or outside the property 300. Conditions recorded by an environmental sensor may include (but are not limited to) the air quality present in property 300, the presence of mold/bacteria/algae/lead paint or any contaminant adverse to human health (whether airborne or attached to a portion of the structure of property 300). Such environmental readings from one or more locations inside and/or outside the property 300 could thus be recorded by the computing server device 103 and used by an analysis model in various ways.

Appliance Sensor—configured and operational to preferably detect various operating parameters relating to appliances within a property 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc.) electrical generator system, pool filtration and heating system, garage door openers, sump pump and water well system, septic tank system, garage door opener, etc. An appliance sensor may comprise detection hardware, or may employ one or more remote probes, which may be located inside and/or outside the property 300 functional to detect certain operating parameters of appliances. Operating parameters detected by an appliance sensor 102 may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). Such appliance readings from one or more property appliances could thus be recorded by the computing server device 103 and used by an analysis model in various ways.

With exemplary sensors 102 identified and briefly described above, and as will be further discussed below, it is to be generally understood that sensors 102 preferably record certain data parameters relating to the condition data of a property. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of the property 300; external sensors located external of the structure of the property 300; sound sensors for detecting ambient noise (e.g., for detecting termite and rodent activity, glass breakage, intruders, etc.); camera sensors such as those consisting of camera stand-alone devices, or by integrating into existing camera devices in the property 300. It is additionally to be understood and appreciated that sensors 102 can be networked into a central computer hub (e.g., the computing server device 103) in a property to aggregate and/or encrypt collected sensor data packets. Aggregated and/or encrypted data packets can be analyzed either in a computer system (e.g., computing server device 103) or via an external computer environment (e.g., management server 106). Additionally, it is to be understood that data packets collected from sensors 102 can be aggregated and/or encrypted in computing server device 103 and sent as an aggregated and/or encrypted packet to the management server 106 for subsequent analysis whereby data packets may be transmitted at prescribed time intervals (e.g., a benefit is to reduce cellular charges in that some property 300 may not have Internet access or cellular service is backup when property Internet service is nonfunctioning).

In accordance with an illustrated embodiment, in addition to the aforementioned, the sensors 102 being utilized relative to property 300, computing server device 103 may additionally be coupled to a Clock 320 (e.g., timer), which may keep track of time for the computing server device 103, thereby allowing a given item of data to be associated with the time at which the data was captured. For example, the computing server device 103 may recurrently capture readings of temperature, wind speed, humidity, appliance operating times, etc., and may timestamp each reading. The time at which the readings are taken may be used to reconstruct events or for other analytic purposes, such as those described below. For example, the timestamps on wall structure readings taken by a structural sensor during a hurricane may allow it to be determined, after the hurricane has occurred, if the property is in need of immediate repair.

A storage component 322 may further be provided and utilized to store data readings and/or timestamps in the computing server device 103. For example, storage component 322 may comprise, or may otherwise make use of, magnetic or optical disks, volatile random-access memory, non-volatile random-access-memory, or any other type of storage device. There may be sufficient data storage capacity to store data generated as a result of several hours or several days of readings. For example, a plurality of water flow sensors 102 might be measuring and recording the amount of water flowing through each of the faucets/showerheads in a property 300. Storage component 322 might have sufficient storage capacity to allow, for example, five days of readings to be stored, thereby allowing determining daily water consumption pattern.

A communication component 324 may further be provided and utilized to communicate recorded information from computing server device 103 to an external location, such as computer management server 106. Communication component 324 may be, or may comprise, a network communication card such as an Ethernet card, a Wi-Fi card, or any other communication mechanism. However, communication component 324 could take any form and is not limited to these examples. Communication component 324 might encrypt data that it communicates, in order to protect the security and/or privacy of the data. Communication component 324 may communicate data recorded by the computing server device 103 (e.g., data stored in storage component 322) to an external location, such as management server 106. For example, management server 106 may collect data from computing server device 103 in order to learn about habits, trends and other analytics relative to property 300 in which the computing server device 103 located. Communication component 324 may initiate communication sessions with management server 106. Additionally or alternatively, the management server 106 may contact computing server device 103, through communication component 324, in order to receive data that has been stored by the computing server device 103 or command a functionally behavior modification for any sensor 102.

Management server 106 may further include a command generation engine. The command generation engine may send commands to sensors 102 or to the computing server device 103 to be sent to the sensors 102 at predefined times. Such commands may include, for exemplary purposes only and without limitation, an instruction to take an immediate reading, an instruction to take a series of readings (e.g., every five minutes for one hour, every minute for one week), an instruction to take more frequent readings (e.g., every hour rather than every six hours), an instruction to take less frequent readings (e.g., every day rather than every hour), and/or any permutations or derivations thereof, such as any modification to a frequency of data capture associated with any sensor 102.

In some embodiments, the data packets received by the management server 106 may be immediately analyzed and then discarded. In some embodiments, the data packets may be analyzed and stored temporarily. For example, the management server 106 may transmit and store the captured data into an internal or an external database. The management server 106 may also utilize specific memory components (such as cache) for different types of data captured. The data packets may be temporarily stored in the cache, whereby the management server 106 deletes the oldest data and adds the newest data. The cache may store the data until the management server 106 determines whether to delete some or all of the cache data or move some or all of the data to a different memory. For example, the management server 106 may store data associated with the motion sensor 102 in a memory structure that offers faster retrieval (e.g., cache) and store other captured data (e.g., electricity voltage reading when the electricity voltage does not have an unexpected surge or decrease and does not indicate an electrical problem) in a conventional memory (e.g., conventional database, which may be internal or external and does not offer a faster data retrieval option). In yet another embodiment, the data packets received, may be stored by the management server 106 for later analysis. In addition, in still another embodiment, the information is stored via another device/module/engine. The management server 106 may then determine and update one or more data records associated with the property 300 in a database to reflect the determined conditions of the structure. In some embodiments, the management server 106 may only store a portion of the data captured. For example, the management server 106 may discard any captured data that is deemed "normal" (e.g., does not indicate a risk to the dwelling) and satisfies a time threshold (e.g., one year, one month, or any other pre-determined time threshold). Because the volume of data captured by multiple sensors may become very large, the management server 106 may utilize the above-mentioned methods to manage memory space and increase the efficiency of data collection, retrieval, and analysis.

Additionally, data from sensors 102, clock 320 and/or storage component 322 may be communicated directly to management server 106, via the communication network 100, thus obviating or mitigating the need for computing server device 103. In the example of FIG. 3, communication component 324 (which is shown, in FIG. 3, as being part of, or used by, computing server device 103) communicates data to management server 106. Management server 106 may comprise, or otherwise may cooperate with, a data analysis module 304, which may analyze the data received. Data analysis module 304 may comprise various types of sub-modules, such as analyzer module 306 and profile engine 308. In general, analyzer module 306 may perform an analysis of collected data regarding various aspects of property 300, such as data used to determine habits and activities of inhabitants of the property.

Management server 106 may further include profile engine 308. The inhabitant profile engine 308 may analyze the data such as described above with respect to different sensors 102. The profile engine 308 may also generate an inhabitant dataset and continuously monitor the building condition data received to generate thresholds used by the computing server device 103. For example, the profile engine 308 may monitor water usage of the property and determine that the water usage is typically higher when a particular inhabitant is present in the property 300. As described below, the computing server device 103 or the management server 106 may generate a dynamic threshold for different building condition data (e.g., water usage, electricity, and the like) based on the inhabitant's habits.

Figure 4:
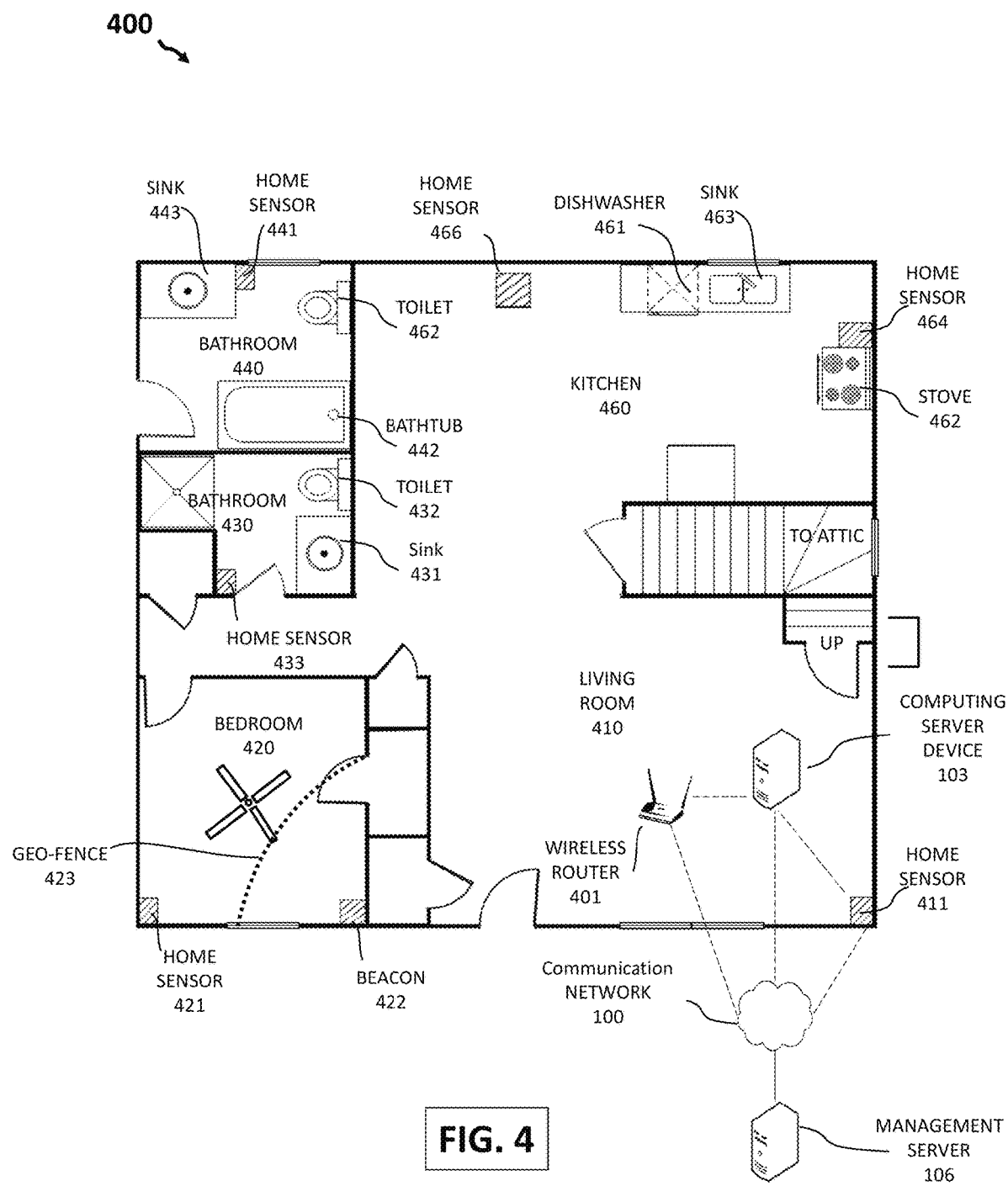
FIG. 4 illustrates a floor plan of an example property with multiple home sensors, in accordance with an illustrated embodiment.

Referring now to FIG. 4, an exemplary floor plan of a property (e.g., the property 300) with multiple home sensors is illustrated. In this embodiment, property 400 includes bathroom 440, bathroom 430, bedroom 420, living room 410, and kitchen 460. Each room within the property 400 may also include different components. For example, the bathroom 440 may include sink 443, toilet 432, and bathtub 442; the bathroom 430 may include toilet 432 and sink 431; and the kitchen 460 may include stove 462, sink 463, and dishwasher 461. Property 400 may also include various pluming, mechanical, and/or electrical features, such as different pipes, electrical wiring, and HVAC ducts; for clarity purposes, not all the above-mentioned features are shown. The property 400 is also equipped with multiple home sensors with various functionalities and configurations. For example, property 400 may include home sensor 441 (installed in the bathroom 440), home sensor 433 (installed in the bathroom 430), home sensors 421 (installed in the bedroom 420), home sensors 411 (installed in the living room 410), home sensor 464 (installed in the kitchen 460), and home sensors 466 (installed near or on the pipe 465). Each of the home sensors illustrated within the property 400 may represent one or more sensors as described above (e.g., sensors 102). For example, home sensor 421 may represent two sensors installed separately (e.g., a motion sensor and a gas detection sensor) or may represent one sensor with both functionality (e.g., one sensor that is configured to detect motion and gas).

As described above, each home sensor is configured to directly communicate with the management server 106 or, in some embodiments, communicate with the management server 106 through the computing server device 103. In some embodiments, each home sensor is wirelessly (or using LAN) connected with the property computing device 300, which may receive, aggregate, encrypt and/or store data before transmitting the data captured from the home sensors to the management server 106 using a wireless network such as the communication network 100 (described in detail in FIG. 1). The management server 106 may then decrypt, disaggregate, and analyze the data from each home sensor installed within the property 400 and generate instructions to command and control the functional behavior of each home sensor. The management server 106 may also reconfigure or activate any of the home sensors. For example, if the management server 106 detects that the inhabitants do not usually use bathroom 430, the management server 106 may de-activate home sensor 433 (e.g., command the home sensor 433 to stop capturing data) or reconfigure the home sensor 433 (e.g., change the configuration of home sensor 433 so that home sensor 433 captures data only once per month). As described below, the management server 106 may (upon various analysis of data captured from other sensors) re-activate or reconfigure the home sensor 433. In another embodiment, the management server 106 may detect a particular inhabitant and may reconfigure one or more home sensors. For example, the management server 106 may command a temperature sensor to modify the temperature of the house based on who is present within the property 400 at any time.

In addition to the home sensors described above, the management server 106 may also use beacons to detect the presence (or location of) one or more inhabitants within the property 400. For example, the beacon 422 may be a hardware transmitter and a communication device, which communicates with electronic devices such as the mobile device of the inhabitants within the property. The beacon 422, in some embodiments, may utilize Bluetooth low energy (BLE) transmission technology to communicate with electronic devices within a pre-determined proximity zone, such as the proximity zone represented by the geo-fence 423. The beacon 422 may broadcast an identifier to nearby portable electronic devices located within the geo-fence 423, such as the mobile device of the inhabitants of the property. In an embodiment, geo-fence 423 represents the range of transmission of identifier by the beacon 422. For example, the beacon 422 may be instructed (by the management server 106) to transmit identifiers within a radius of 10 feet (within the geo-fence 423).

In some embodiments, the beacon 422 may transmit a Universally Unique Identifier (UUID) as an identifier. A UUID is a 128-bit value identifier used in software construction. The beacon 422 may also receive UUID of the mobile device of the inhabitant of the property and transmit said UUID to the management server 106. The management server 106, may then, transmit said UUID and query a database for any information associated with said UUID and the mobile device transmitting the UUID. For example, the database may transmit identifying information (e.g., profile data) associated with the mobile device transmitting the UUID to the management server 106. The management server may then (matching the UUID for the property 400 and the identifying information received from the database) determine a location associated with the inhabitant of the room.

For example, beacon 422 may broadcast a UUID of 12345X within the geo-fence 423. Upon an inhabitant entering the geo-fence 423, his mobile device receives the UUID and transmits (using an application executing on the mobile device that is associated with the management server 106) the UUID to the management server 106. The management server 106 may then match the UUID received and determine that the UUID received matches the UUID of beacon 422. The management server 106 may then further determine that the mobile device transmitting the UUID of beacon 422 is associated with John Smith (using a unique electronic identifier associated with the mobile device). The management server 106 may then determine that John Smith in in bedroom 420.

Figure 5:
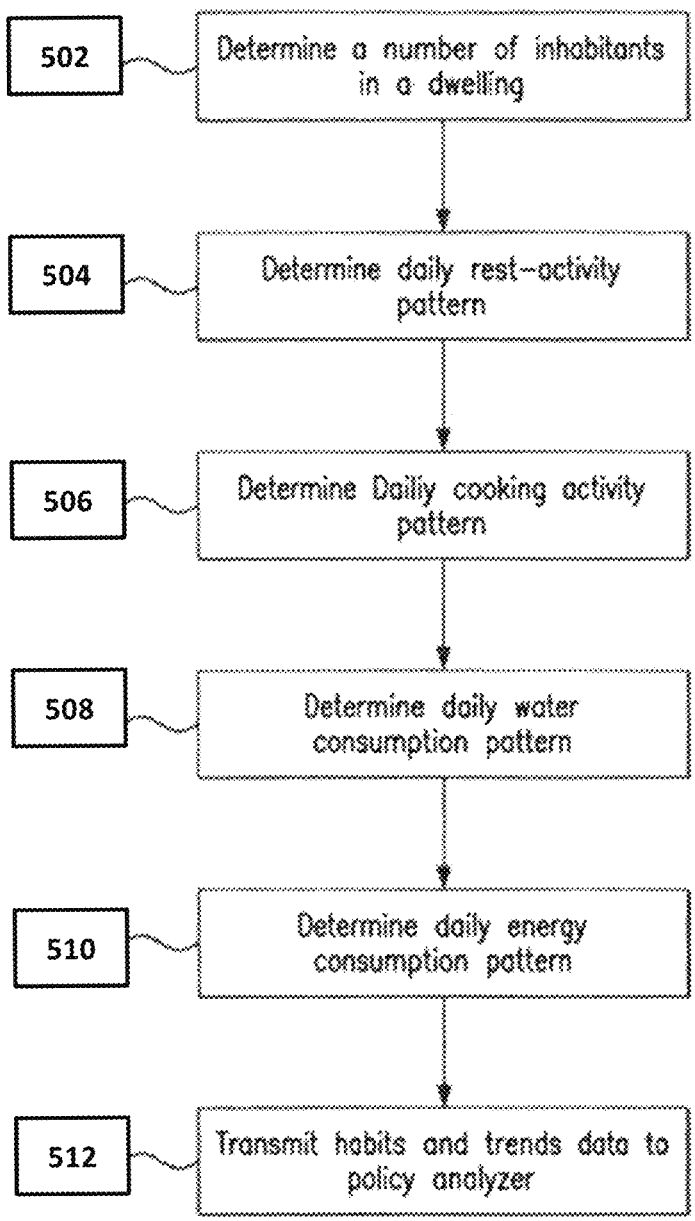
FIG. 5 is a flow diagram of operational steps of the management server managing multiple home sensors, in accordance with an illustrated embodiment.
Figure 6:
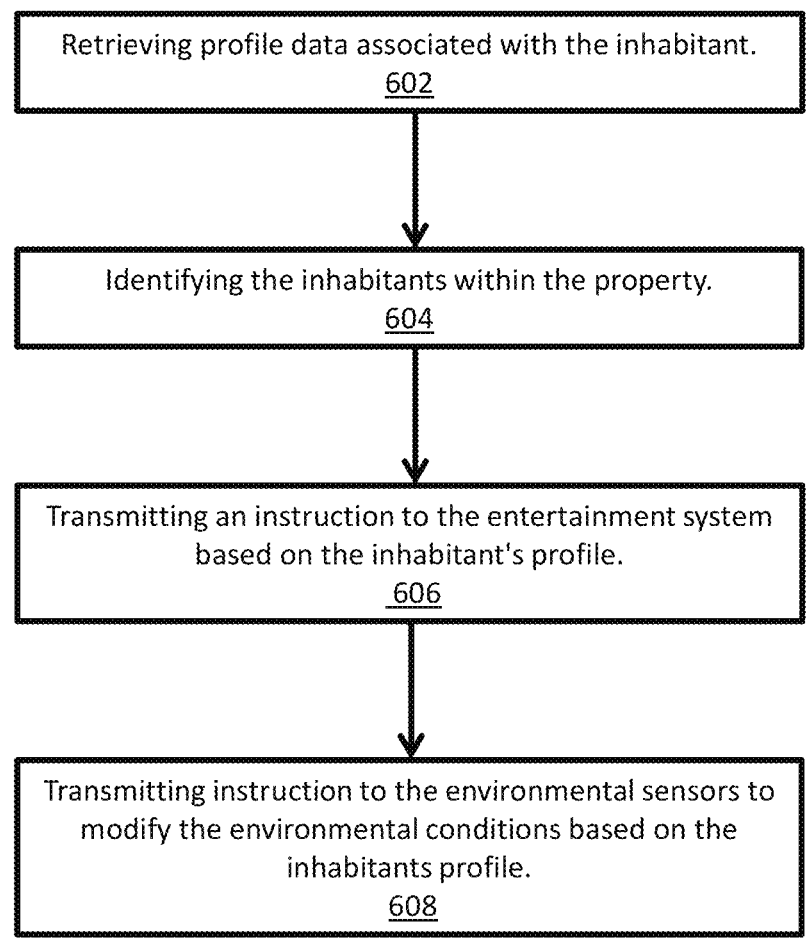
FIG. 6 is a flow diagram of operational steps of the management server managing multiple home sensors, in accordance with an illustrated embodiment.

FIGS. 5-6 illustrate, in the form of a flow chart, exemplary operational steps performed by different components of the management server. The flow diagram shown in FIGS. 5-6 are described, by way of example, with reference to components shown in FIGS. 1-4, although these operational steps may be carried out in any system and are not limited to the scenario shown in the aforementioned figures. Additionally, the flow diagrams in FIGS. 5-6 show an example in which operational steps are carried out in a particular order, as indicated by the lines connecting the blocks, but the various steps shown in these diagrams can be performed in any order, or in any combination or sub-combination.

With reference to FIG. 5, at 502, the management server preferably collects data from one or more sensors preferably to be used to determine a number and the identity of people (inhabitants) occupying a property at various points in time. The management server may directly receive the data packets transmitted by the informatic sensors or, in some embodiments, the management server may receive them from the computing server device installed at the property. As described herein, computer analytics are performed (preferably by the management server) on the received informatic sensor data to determine behavioral habits and activities of one or more inhabitants associated with (e.g., occupying) the property. In one embodiment, the management server may be configured and operational to send additional commands to one or more electronic sensors and/or computing device. These commands may alter the types of measurements being performed, the frequency of measurements, speed/frequency in which information is communicated from sensors and/or any other sensor settings.

In an embodiment, this step may involve the computing device periodically contacting (via the communication network 100 or any other suitable means), at prescribed time intervals, the management server to send data collected by a plurality of motion sensors. A variety of motion sensors are preferably installed at various points around the property, such as in the living room, bedroom, kitchen, and bathroom. The sensors are arranged to communicate with the computing device, which, for example, may be located in a hallway near a main entrance of the property. The one or more motion sensors may be configured and operational to monitor movement of property inhabitants in different areas of the property. In an embodiment, motion sensors may comprise passive infrared detectors. Upon receiving the data packets from the motions sensors, the management server may determine, for example, whether the property was occupied by more than one inhabitant by detecting substantially simultaneous motion patterns at various points around the property. As described below, the management server may analyze the data received from one or more motion sensors to identify the inhabitant.

At 504, the management server preferably processes the informatics data collected by a plurality of motion sensors to determine daily rest-activity pattern for each inhabitant. For example, the management server may estimate rest-activity parameters such as bedtime, rise time, sleep latency, and naptime for one or more inhabitants of the property by combining data from multiple sensors located around the property. As another example, the management server may be configured to determine whether the property remains unoccupied for an extended period of time. This information may be used by the management server (e.g., the profile engine) to refine a habit profile associated with the property and with each inhabitant of the property.

At 506, based on data collected from different sensors installed on the property, the management server preferably conducts an analysis to determine daily cooking activity pattern of one or more property inhabitants. In an embodiment, one or more appliance sensors may be employed to measure the use of cooking appliances such as a kettle, a microwave oven or an electric cooker. For example, the management server may detect the cooking time trends by detecting that a rice cooker or microwave oven is turned on/off, detecting that a gas range or an IH (Induction-Heating) cooking heater is turned on/off or detecting other cooking home electric appliances are turned on/off. As another example, the management server may combine data collected from various types of sensors, such as motion and appliance sensors, to determine, for instance, whether any of the cooking appliances remain unattended for an extended period of time, thus increasing the risk of fire. The daily cooking activity tracking may be adaptive. In other words, the management server may gradually adjust to the inhabitant's new activities and/or habits if they change over time. In general, the management server may assess the risk of fires or other events arising from various activities of inhabitants of a property or location and/or observed events and use this information to provide targeted specific advice and guidance at the property to reduce the chance of fires or other events arising from the activities.

At 508, the management server conducts an analysis to determine daily water consumption pattern. For example, based upon analysis of a plumbing system, the management server may have detected long-term stress on pipes and may predict future plumbing leaks. In order to prevent water leaks, the management server may recommend reducing water pressure (e.g., by installing a water softener). Property inhabitants' behavior patterns during a storm can also increase the risk of flooding. For example, a combination of washing clothes, taking a shower, and running the dishwasher could add water to a system that may already be overloaded. The water may have nowhere to go but into the basement of the property. Thus, the management server may identify certain water consumption patterns of property inhabitants as hazardous and use this information to provide targeted specific advice and guidance to reduce the risk of water losses at the property.

Similarly, at 510, the management server preferably performs an analysis to determine daily energy consumption pattern. For example, based upon analysis of the property's electrical system, the management server may have detected the load pattern and energy amount are different in weekdays and weekends. For instance, during the weekday the minimum load may occur between 2:00 and 6:00 in the morning when most of property occupants are sleeping and morning peak may be between approximately 7:00 AM and 10:00 AM, while the night peak may occur between approximately 7:00 PM and midnight when the property inhabitants are at home, making dinner and using the entertainment appliances. On weekends, there might be a mid-day peak load between approximately 10:00 AM and 03:00 PM, while night peak may occur between approximately 07:00 PM and 10:00 PM. In addition, in this step, the management server may flag certain energy consumption patterns of inhabitants as hazardous.

Thus, in steps 502-510, the management server collects various characteristics indicative of habits and activities of the property's inhabitants. At 512, the management server preferably transmits these characteristics to the profile engine. In an embodiment, the property's inhabitants' habits and characteristics may include, but not limited to, daily water consumption and energy consumption patterns, daily cooking activity pattern, number of inhabitants, hazardous activities pattern, and the like. In an alternative embodiment, the management server may store these habits and characteristics in a local or remote database. The readings of the amount of energy/water used at the property can be used to analyze and forecast an expected energy/water bill. This can also be used for budgeting and finance management because a history of energy/water usage at the property or certain appliances can be measured and displayed to the inhabitants. Additionally, the homeowner can track energy/water use and determine based upon the rate of energy consumption that the homeowner is on a pace to use more or less energy/water use than is budgeted. In addition to generating a profile for the property, the management server may also generate a habit profile for each inhabitant of the property. This individual profile is also adaptive and may be refined by the management server over time.

Referring now to FIG. 6, a flow diagram of operational steps for managing multiple home sensors is illustrated. At 602, the management server preferably retrieves property and inhabitant habit profiles and activity information from the profile engine. As described in FIG. 5, the management server may continuously monitor the property and the inhabitants and may generate and store a profile for each inhabitant within the property. The management server may query a database and retrieve profile data associated with a property. In some embodiments, this step may involve the management server retrieving habits and activity profiles (e.g., profile data associated with each inhabitant) information from the profile engine component or from a local (or third party) database.

As described in FIG. 5, the profile for each inhabitant may include habits, daily rest patterns, activities, cooking patterns, appliance usage patterns, water/electricity consumption patterns, and any other data captured by the home sensors. The management server may display each inhabitant's profile and allow the inhabitants to modify, add, and/or remove data from their profile. For example, the management server may display the father's profile by transmitting an instruction to the father's electronic device to render a graphical user interface and display the father's profile data. In some embodiments, the management server may display the father's profile data on a website displayed on the father's electronic device. For example, the father may login a website provided by the management server and (upon being authenticated) the management server may display the father's profile data. The father may then modify, add, or remove profile data. For example, the father may add additional environmental preferences to the profile (e.g., ideal temperature, ideal lighting, and/or ideal humidity).

At 604, the management server may identify one or more inhabitants within the property. The management server may receive a set of data from the motions sensor and the camera sensor and identify one or more inhabitants based on the data packets received from each sensor. For example, the motion sensor may detect heat emitting from bodies within the properties (using infrared technology) and transmit heat maps of warm bodies within the property to the management server. The management server may determine the identities of the inhabitants by comparing the heat map with an existing profile of the inhabitants. For example, the management server may retrieve data associated with each inhabitant of the property (e.g., height, weight, image of each inhabitant, and the like) from the inhabitants (e.g., inhabitants may log into a graphical user interface, such as a website, and input the above-mentioned data). The management server may then identify the inhabitants based on the heat map received from the motion sensors. For example, when a heat map received from the motion sensor indicates that a person of 6'2" height is present in the property; the management server may query a database, receive a profile of all inhabitants of the property, and determine that the father's height is 6'2". The management server may then determine that the father is present in the property.

In some other embodiments, the camera sensor may periodically capture images (e.g., low-resolution images) from the property. The camera sensor may transmit the captured images to the management server, which may then use facial recognition techniques to identify the inhabitants present within the property. For example, the management server may identify that the image captured within the living room resembles an image of the father by comparing the received image with an image of the father stored within the property profile, as described above. In some embodiments, the management server may transmit the images received from the camera sensor to a third-party server (e.g., cloud computing device associated with a third party) that is configured to perform facial recognition and transmit the results to the management server.

In some embodiments, the management server may utilize both the motion sensor and the camera sensor to identify the inhabitants present within the property. For example, when the management server receives an indication (from the motion sensor) that a person is present within the property, the management server may generate and transmit an instruction to the camera sensor to modify its data capture frequency and immediately capture an image of different areas within the property. The management server may then perform facial recognition on the received images and identify the inhabitant present. In some embodiments, the management server may also command the camera sensor to capture an image from a specific part of the property. For example, if the motion sensor captures movement (or heat) associated with a person within the living room, the management sensor may command the camera sensor to only capture images from the living room. In some other embodiments, the management server may also modify the field of vision associated with the camera sensor in order to receive an image of the inhabitants present within the property.

The management server may also activate, reconfigure, or modify the functional behavior of the motion sensor based on data packets received from the camera sensor. For example, the management sensor may receive an image from the camera sensor that indicates presence of an inhabitant within the living room. If the management server is unable to identify the inhabitant (e.g., if the facial recognition fails), the management server may activate the motion sensor and (as described above) command the motion sensor to modify its functional behavior (e.g., frequency of data capture) and capture a heat map of the property. The management server may also modify the motion sensor's field of vision and command a heat/motion capture associated with a specific area within the property. The management server may then use the data received from the camera sensor and the motion sensor to identify the inhabitant present.

In some embodiments, the management server may use micro location and beacon technology to identify one or more inhabitants present within the property. As described above, the management server may also use a location-aware mobile device associated with an inhabitant of the property (e.g., mobile device) to identify a location of the inhabitants within the property.

At step 606, the management server may modify one or more environmental sensors based on the inhabitant's profile. The management server may generate and transmit an instruction to one or more environmental sensors/devices to comply with the inhabitant's profile. In a non-limiting example, the management sever may first determine that the father is the only person present within the property and the father has a temperature preference of 74 degrees; the management server may then reconfigure a thermostat within the property to 74 degrees. In another example, the management server may automatically shut the blinds, turn on or off the humidifier, or modify (e.g., turn on or off) the lighting within the property (e.g., in certain areas of the property based on the father's preferences).

In some embodiments, the management server may use predetermined rules to generate the instruction for the one or more environmental sensors. For example, in an embodiment, the management server may determine that two inhabitants are present within the property (e.g., father and his son). Consequently, the management server may query a set of preexisting rules to determine that when the father and son are both present within the property, the environmental settings may be modified based on the father's environmental preferences. The set of predetermined rules may be inputted by the inhabitants or may be monitored and determined by the management server (e.g., based on previous data received from different sensors). For example, the father may add the above-mentioned rule to the property profile. Additionally or alternatively, the management server may determine that when the father and son are both present within the property, the environmental building condition data (received from the temperature sensor) is consistent with the father environmental preferences. Consequently, the management server may generate a rule that allows the environmental conditions to be modified based on the father's environmental preferences when the father and son are both present within the property.

At step 608, the management server may also modify an entertainment system associated with the property in accordance with the inhabitant's preferences. As described above, the management server may generate an instruction to play the identified inhabitant's favorite music or radio program. The management server may transmit the instruction to any home entertainment devices within the property. For example, when the father arrives, the management server may instruct a radio to play the father's favorite radio channel. In other embodiments, when the management server detects presence of a young adult within the property, the management server may prevent any adult rated television programs to be played. In some embodiments, the management server may directly contact the home entertainment devices. For example, the home entertainment devices may be connected to a home network using a wireless router (e.g., home wireless router 401 described in FIG. 4) and the management server may transmit the instruction to the home entertainment devices via the home network and utilizing the router. The management sever may also transmit a message (e.g., text, push notification, email, and the like) the identified inhabitant and notify them of the change. For example, the management server may notify the father that his favorite radio show is now playing or the temperature has been modified to his liking.

Figure 7:
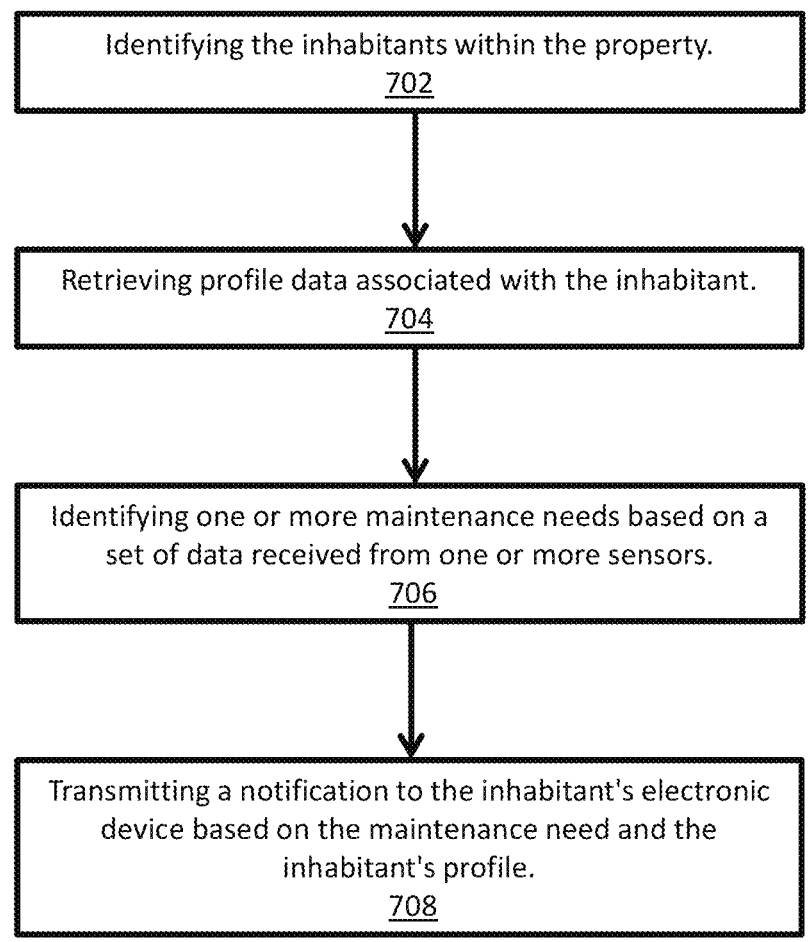
FIG. 7 is a flow diagram of operational steps of the management server managing multiple home sensors, in accordance with an illustrated embodiment.

Referring now to FIG. 7, a flow diagram of operational steps for managing multiple home sensors is illustrated. At step 702 and 704, the management server may identify one or more inhabitants within the property and retrieve profile data associated with each present inhabitant using the above-mentioned methods as described in FIG. 6. At step 706, the management server may, upon identifying/retrieving the present inhabitant's profile data, identify one or more maintenance needs associated with the property. In a non-limiting example, the management server may compare the operating parameters associated with one or more appliances received from the appliance sensor with a set of predetermined thresholds. When any of the operating parameters of the one or more appliances satisfies the set of pre-determined threshold, the management server may determine that the particular appliance requires maintenance.

At step 708, the management server may transmit an electronic notification to an electronic device associated with at least one inhabitant present within the property based on the maintenance needs identified and the inhabitant's profile data. The management server may identify one or more inhabitants who have indicated a desire to receive maintenance alerts. In a non-limiting example, and as described above, an inhabitant may indicate a desire to receive maintenance alerts on his/her profile. For example, the property profile may indicate the father and the mother of the family as available to receive alerts regarding maintenance needs and requirements. Consequently, the management server may only notify the father and mother (and not the children) when a maintenance need arises.

Upon identifying the right party, the management server may retrieve an electronic identifier associated with an electronic device of the father and/or mother (e.g., query a database to identify a phone number or email address of the father or mother). The management server may then transmit an electronic notification to the electronic device associated with the designated inhabitants. The notification may be in form of a text, email, push notification, and the like. The notification may include identification of the appliance, maintenance requirements, and/or a hyperlink directing the inhabitants to the footage of the appliance (captured from the camera sensor). Furthermore, the management server may also notify a third party (e.g., a third party computing device such as a home security, maintenance service, pest control, insurance company, or an emergency service).

In some embodiments, the management server may notify an inhabitant when the inhabitant is within a predetermined proximity to the appliance in need of maintenance. For example, the management server may identify water leakage in a bathroom. In a non-limiting example, and in conjunction with the illustrated embodiment in FIG. 4, the management server may receive a set of data from the home sensor 441 and determine maintenance requirement for the sink 443

(e.g., water leakage). The management server may then identify two people (e.g., father and mother of the household) as designated recipients of maintenance notifications. In some embodiments, the management server may only transmit the notification upon either the father or mother entering the bathroom 440. The management server may user any of the above-mentioned methods to determine whether the recipient is within the predetermined proximity to the appliance in need of maintenance (e.g., determine whether the father or mother is in the bathroom 440).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The term "module"/"engine" is used herein to denote a functional operation that may be embodied either as a stand-alone component or as an integrated configuration of a plurality of subordinate components. Thus, "modules"/"engines" may be implemented as a single module or as a plurality of modules that operate in cooperation with one another. Moreover, although "modules"/"engines" may be described herein as being implemented as software, they could be implemented in any of hardware (e.g. electronic circuitry), firmware, software, or a combination thereof.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

What we claim is:

1. A method comprising:
   receiving, by a server, a set of building condition data
      from a plurality of sensors associated with a building and connected to a network of the building, wherein the set of building condition data comprises at least a heat map indicating a human presence within the building;

determining, by the server, a location of at least one person within the building based on the set of building condition data;

transmitting, by the server, a first instruction modifying a field of view of a camera connected to the network of the building to focus within the location of the at least one person and commanding the camera to perform an immediate capture of at least one image in response to determining the location of the at least one person within the building;

after transmitting the first instruction to the camera, receiving, by the server, the at least one image captured by the camera;

transmitting, by the server, a second instruction to at least one of the plurality of sensors to capture location-based building condition data based on the location of the at least one person and information indicative of a corresponding location associated with the at least one of the plurality of sensors;

identifying, by the server, the at least one person present within the building based on the location-based building condition data and the at least one image received by the server;

retrieving, by the server, profile data corresponding to the at least one person identified by the server, the profile data comprising at least an environmental preference value;

analyzing, by the server, the profile data and the set of building condition data to determine an associated risk value;

generating, by the server, a third instruction in accordance with the environmental preference value; and transmitting, by the server, the third instruction along with guidance based on the risk value to one or more environmental devices connected to the network of the building, whereby the third instruction commands the one or more environmental devices to modify an environmental condition of the building based on the environmental preference value and to provide an alert indicating the guidance.

2. The method of claim 1, comprising identifying, by the server, the at least one person present within the building by performing facial recognition on the at least one image captured by the camera and comparing the at least one image to a previously recorded image of the at least one person.

3. The method of claim 2, wherein the facial recognition is performed by a third-party server.

4. The method of claim 1, wherein the one or more environmental devices comprises at least one of a thermostat, humidifier, or a lighting system of the building.

5. The method of claim 1, wherein the profile data is electronically received via a user interface.

6. The method of claim 5, wherein the profile data is generated based on data received from an additional plurality of sensors in the building, wherein the additional plurality of sensors is configured to detect human conduct.

7. The method of claim 6, further comprising:
identifying, by the server, a maintenance need associated with at least one appliance within the building; and
upon identifying the at least one person present within the building based on the location-based building condition data and the at least one image received by the server, transmitting, by the server, an electronic notification corresponding to the maintenance need to an electronic device operated by the at least one person.

8. The method of claim 1, wherein the environmental preference value comprises a value corresponding to a temperature, humidity, or lighting of the building.

9. The method of claim 1, further comprising:
transmitting, by the server, a notification to an electronic device operated by the at least one person configured to notify the at least one person of the third instruction.

10. The method of claim 9, wherein the notification is in form of at least one of an email, text message, and push notification.

11. A computer system comprising:
a plurality of home sensor devices connected to a network of a building and configured to collect building condition data, wherein the plurality of home sensor devices comprises at least a camera and a plurality of additional sensors;

one or more environmental devices coupled to the network of the building and configured to modify environmental conditions of the building; and a server connected to the network and in connection with the one or more environmental devices and the plurality of home sensors devices, wherein the server is configured to:
receive a set of building condition data from the plurality of additional sensors via the network, wherein the set of building condition data comprises at least a heat map indicating human presence within the building;

determine a location of at least one person within the building based on the set of building condition data;

transmit a first instruction modifying a field of view of the camera of the plurality of home sensor devices connected to the network of the building to focus within the location of the at least one person and commanding an immediate capture of at least one image by the camera in response to determining the location of the at least one person within the building;

after transmitting the first instruction to the camera, receive the at least one image captured by the camera;

transmit a second instruction to at least one of the plurality of additional sensors to capture location-based building condition data based on the location of the at least one person and information indicative of a corresponding location associated with the at least one of the plurality of additional sensors;

identify the at least one person present within the building based on the location-based building condition data and the at least one image received by the server;

retrieve profile data corresponding to the at least one person, the profile data comprising at least an environmental preference value of the at least one person;

analyze the profile data to determine an associated risk value;

generate a third instruction in accordance with the environmental preference value; and transmit the third instruction to one or more environmental devices coupled to the network of the building, whereby the third instruction commands the one or more environmental devices to modify an environmental condition of the building based on the environmental preference value and to display user guidance based on the risk value.

12. The method of claim 1, comprising identifying, by the server, a current activity of the at least one person in conjunction with analyzing the profile data to determine the associated risk value.

13. The method of claim 12, comprising identifying, by the server, a parameter value, wherein identifying the current activity of the at least one person comprises comparing the parameter value with a threshold.

14. The computer system of claim 11, wherein the profile data comprises habit and activity data for the at least one person, and the server is configured to analyze the habit and activity data to determine the associated risk value.

15. The computer system of claim 14, wherein the server is configured to determine the habit and activity data via the heat map.

16. The method of claim 1, comprising:
determining, by the server, information associated with mitigating the risk value; and
transmitting, by the server, the information associated with mitigating the risk value via the guidance.

17. The method of claim 1, comprising:
determining, by the server, an additional location of at least one additional person within the building based on the set of the building condition data;
transmitting, by the server, a fourth instruction modifying an additional field of view of an additional camera connected to the network of the building to focus within the additional location of the at least one additional person and commanding an immediate capture of at least one additional image by the additional camera in response to determining the additional location of the at least one additional person;
after transmitting the fourth instruction to the additional camera, receiving, by the server, the at least one additional image;
determining, by the server, that the at least one additional person is unidentifiable based on the at least one additional image;
transmitting, by the server, a fifth instruction to the at least one of the plurality of sensors to capture additional location-based building condition data based on the additional location of the at least one additional person in response to a determination that the at least one additional person is unidentifiable based on the at least one additional image, wherein the additional location-based building condition data comprises at least one additional heat map of the additional location of the at least one additional person;
after transmitting the fifth instruction to the at least one of the plurality of sensors, receiving the at least one additional heat map; and
identifying the at least one additional person based on the at least one additional heat map and the at least one additional image.

18. The method of claim 1, wherein the second instruction modifies a field of vision and a frequency of data capture associated with the plurality of sensors to focus within the location of the at least one person and immediately capture the location-based building condition data, respectively.

* * * * *